United States Patent
Takayama et al.

(10) Patent No.: US 6,421,196 B1
(45) Date of Patent: Jul. 16, 2002

(54) METHOD AND APPARATUS FOR CONTROLLING RECORDING MEDIUM

(75) Inventors: Yoshihisa Takayama; Kazuyuki Hirooka, both of Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/366,662

(22) Filed: Aug. 3, 1999

(30) Foreign Application Priority Data

Aug. 4, 1998 (JP) .......................................... 10-220352

(51) Int. Cl.[7] .......................... G11B 15/18; G11B 27/11
(52) U.S. Cl. ........................ 360/71; 360/69; 360/132; 340/572.8; 340/5.8; 369/52.1; 369/53.21
(58) Field of Search .......................... 360/69, 71, 132, 360/92; 340/572.1, 572.8, 5.8, 10.31, 10.42, 10.51, 10.52, 572.7; 369/52.1, 53.2, 53.21; G11B 27/11

(56) References Cited

U.S. PATENT DOCUMENTS

| | | | |
|---|---|---|---|
| 4,426,684 A | 1/1984 | Sechet et al. | ................ 364/900 |
| 5,418,732 A | 5/1995 | McFadin | .................... 364/478 |
| 5,455,409 A | 10/1995 | Smith et al. | ................. 235/385 |
| 5,636,078 A * | 6/1997 | Tsai | ........................... 360/72.1 |
| 5,819,309 A * | 10/1998 | Gray | .......................... 711/111 |
| 5,852,534 A * | 12/1998 | Ozue et al. | .................... 360/69 |
| 5,867,335 A * | 2/1999 | Ozue et al. | .................... 360/71 |
| 6,065,701 A * | 5/2000 | Tanimura et al. | ........... 242/344 |
| 6,084,736 A * | 7/2000 | Kurokawa et al. | ............ 360/71 |
| 6,088,182 A * | 7/2000 | Taki et al. | ..................... 360/71 |
| 6,195,007 B1 * | 2/2001 | Takayama et al. | ........ 340/572.1 |

FOREIGN PATENT DOCUMENTS

| | | | | |
|---|---|---|---|---|
| EP | 0851421 | | 7/1998 | ........... G11B/27/11 |
| EP | 0942427 | | 9/1999 | ........... G11B/27/11 |
| EP | 942427 | A2 * | 9/1999 | ........... G11B/27/11 |
| JP | 09084147 | | 3/1997 | ........... H04Q/9/00 |
| WO | 9300680 | | 1/1993 | ........... G11B/23/30 |
| WO | 9608015 | | 3/1996 | ........... G11B/27/10 |

* cited by examiner

*Primary Examiner*—David Hudspeth
*Assistant Examiner*—Dan I. Davidson
(74) *Attorney, Agent, or Firm*—Jay H. Maioli

(57) ABSTRACT

A method and apparatus for controlling a recording medium in which a recording medium is recognized by reading identification information from a non-contact-type memory of the recording medium via a remote memory interface. An identifier corresponding to the recognized recording medium is set and given to the non-contact-type memory of the recording medium via the remote memory of the recording medium interface. An operation on the non-contact-type memory is performed with identification of the recording medium by using a command including the identifier.

7 Claims, 33 Drawing Sheets

FIG.4

CONTENTS OF NONVOLATILE MEMORY OF
REMOTE MEMORY CHIP (1) MEMORY FORM
(2) CONTROL FLAGS
(3) MANUFACTURER IDENTIFIER (1 byte) ⎫
(4) SECONDARY IDENTIFIER (1 byte)      ⎬ AUTHENTICATION DATA
(5) SERIAL NUMBER (32 bytes)            ⎪
(6) CRC CODE (2 bytes) OF              ⎭
    SERIAL NUMBER
(7) MEMORY MANUFACTURE DATE
(8) MEMORY MANUFACTURE LINE NAME
(9) MEMORY MANUFACTURE FACTORY NAME
(10) MEMORY MANUFACTURER NAME
(11) MEMORY TYPE NAME
(12) CASSETTE MANUFACTURE LINE NAME
(13) CASSETTE MANUFACTURE DATE
(14) CASSETTE MANUFACTURE FACTORY NAME
(15) CASSETTE MANUFACTURER NAME
(16) CASSETTE NAME
(17) OEM CUSTOMER NAME
(18) TAPE CHARACTERISTIC SPECIFICATION
     INFORMATION
(19) MAXIMUM COMMUNICATION SPEED
(20) BLOCK SIZE
(21) MEMORY CAPACITY
(22) READ-ONLY REGION START ADDRESS
(23) READ-ONLY REGION END ADDRESS
(24) VARIOUS POINTERS
(25) MEMORY MANAGEMENT INFORMATION
(26) VOLUME ATTRIBUTES
(27) VOLUME INFORMATION
(28) VOLUME USE HISTORY INFORMATION
(29) FAST SEARCH SUPPORT MAP INFORMATION
(30) UNLOAD POSITION INFORMATION
(31) USER FREE REGION
(32) RESERVED REGION

(33) SESSION IDENTIFIER (1 byte)

FIG.5(A)  EXAMPLE OF ASSIGNMENT OF MANUFACTURER IDENTIFIERS

| MANUFACTURER ID | | MANUFACTURER NAME |
|---|---|---|
| ASCII | HEX VALUE | |
| S | 53h | Sony Corporation |
| OTHERS | | RESERVED |

FIG.5(B)  EXAMPLE OF ASSIGNMENT OF SECONDARY IDENTIFIERS

| SECONDARY ID | | DEFINITION |
|---|---|---|
| ASCII | HEX VALUE | |
| 1 | 31h | 15m AIT-1 CASSETTE WHOSE SERIAL NUMBER IS OF 6 FIGURES OR LESS |
| 2 | 32h | 70m MIDDLE-LENGTH AIT-1 CASSETTE WHOSE SERIAL NUMBER IS OF 6 FIGURES OR LESS |
| 3 | 33h | 170m STANDARD-LENGTH AIT-1 CASSETTE WHOSE SERIAL NUMBER IS OF 6 FIGURES OR LESS |
| 4 | 34h | 230m STANDARD-LENGTH AIT-1 CASSETTE WHOSE SERIAL NUMBER IS OF 6 FIGURES OR LESS |
| W | 57h | 230m AIT-1 CASSETTE WHOSE SERIAL NUMBER IS OF 7 FIGURES OR MORE |
| X | 58h | 170m AIT-1 CASSETTE WHOSE SERIAL NUMBER IS OF 7 FIGURES OR MORE |
| Y | 59h | 70m MIDDLE-LENGTH AIT-1 CASSETTE WHOSE SERIAL NUMBER IS OF 7 FIGURES OR MORE |
| Z | 5Ah | 15m SHORT-LENGTH AIT-1 CASSETTE WHOSE SERIAL NUMBER IS OF 7 FIGURES OR MORE |

STATE TRANSITIONS OF REMOTE
MEMORY CHIP

FIG.16

| COMMAND(REQUEST) | CONTENT OF COMMAND | ACKNOWLEDGE ISSUED FROM REMOTE MEMORY IC IN RESPONSE TO COMMAND |
|---|---|---|
| ATTENTION_REQ | COMMAND FOR CHECKING WHETHER IDLING STATE IS ESTABLISHED | ATTENTION_ACK |
| REPORT_NUM_H_REQ | COMMAND FOR OBTAINING UPPER 16 BYTES OF SERIAL NUMBER | REPORT_NUM_H_ACK |
| REPORT_NUM_L_REQ | COMMAND FOR OBTAINING LOWER 16 BYTES OF SERIAL NUMBER | REPORT_NUM_L_ACK |
| REPORT_NUM_CRC_REQ | COMMAND FOR OBTAINING CRC CODE OF SERIAL NUMBER | REPORT_NUM_CRC_ACK |
| ASSERT_NUM_H_REQ | COMMAND FOR SPECIFYING UPPER 16 BYTES OF SERIAL NUMBER | ASSERT_NUM_H_ACK |
| ASSERT_NUM_L_REQ | COMMAND FOR SPECIFYING LOWER 16 BYTES OF SERIAL NUMBER | ASSERT_NUM_L_ACK |
| ASSERT_NUM_CRC_REQ | COMMAND FOR SPECIFYING CRC CODE OF SERIAL NUMBER | ASSERT_NUM_CRC_ACK |
| ASSIGN_SID_REQ | COMMAND FOR ASSIGNING SESSION IDENTIFIER | ASSIGN_SID_ACK |
| REPORT_SID_REQ | COMMAND FOR REQUESTING REPORT OF SESSION IDENTIFIER | REPORT_SID_ACK |
| STAT_REQ | COMMAND FOR REQUESTING REPORT OF INTERNAL STATUS | STAT_ACK |
| WR_BLK_REQ | DATA WRITE COMMAND | WR_BLK_ACK |
| RD_BLK_REQ | DATA READ COMMAND | RD_BLK_ACK |
| SOFT_RESET_REQ | SOFTWARE RESET COMMAND | SOFT_RESET_ACK |
| MAINTENANCE_REQ | COMMAND FOR CAUSING TRANSITION TO ISSUANCE STATE | MAINTENANCE_ACK |
| RAW_WR_BLK_REQ | DATA WRITE COMMAND THAT IS EFFECTIVE ONLY IN ISSUANCE STATE | RAW_WR_BLK_ACK |
| RAW_RD_BLK_REQ | DATA READ COMMAND THAT IS EFFECTIVE ONLY IN ISSUANCE STATE | RAW_RD_BLK_ACK |

FIG.17(A)

ATTENTION_REQ PACKET (4 bytes)

| ATTENTION_REQ | 00h | 00h | N |

(N: SESSION IDENTIFIER)

FIG.17(B)

ATTENTION_ACK PACKET (4 bytes)

| ATTENTION_ACK | 00h | 00h | N |

FIG.19(A)

REPORT_NUM_CRC_REQ PACKET (4 bytes)

| REPORT_NUM_CRC_REQ | 00h | 00h | 00h |
|---|---|---|---|

FIG.19(B)

REPORT_NUM_CRC_ACK PACKET (20 bytes)

| REPORT_NUM_CRC_ACK | 00h | 00h | 00h | ... | X | Y |
|---|---|---|---|---|---|---|

ALL 12 bytes: 00h

CRC (X: MANUFACTURER IDENTIFIER
Y: SECONDARY IDENTIFIER)

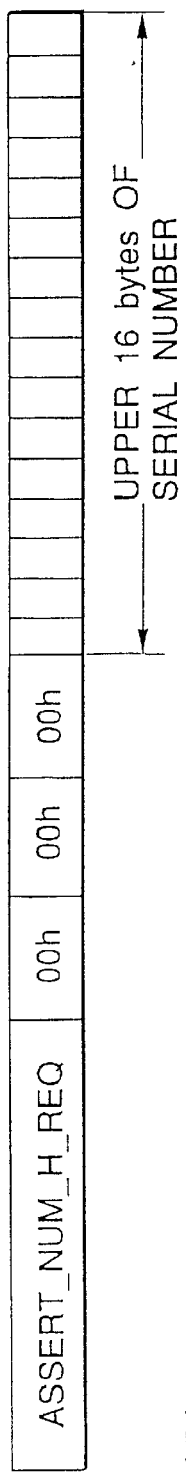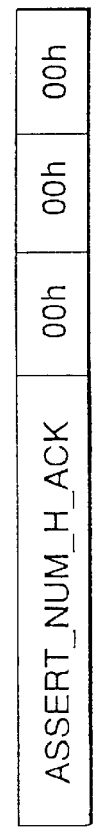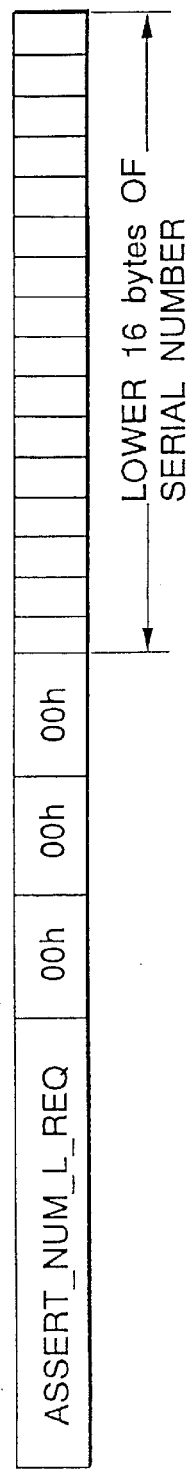
FIG.20(A) ASSERT_NUM_H_REQ PACKET (20 bytes)
FIG.20(B) ASSERT_NUM_H_ACK PACKET (4 bytes)
FIG.20(C) ASSERT_NUM_L_REQ PACKET (20 bytes)
FIG.20(D) ASSERT_NUM_L_ACK PACKET (4 bytes)

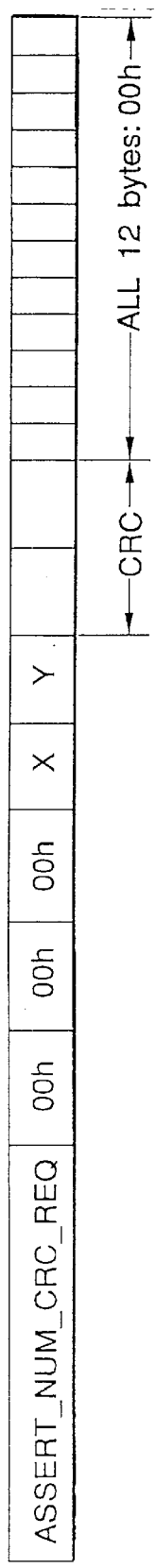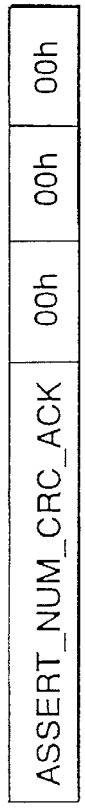

FIG.22(A) ASSIGN_SID_REQ PACKET (4 bytes)

| ASSIGN_SID_REQ | 00h | 00h | N |
|---|---|---|---|

FIG.22(B) ASSIGN_SID_ACK PACKET (4 bytes)

| ASSIGN_SID_ACK | 00h | 00h | N |
|---|---|---|---|

(N: SESSION IDENTIFIER)

FIG.23(A) REPORT_SID_REQ PACKET (4 bytes)

| REPORT_SID_REQ | 00h | 00h | N |

FIG.23(B) REPORT_SID_ACK PACKET (4 bytes)

| REPORT_SID_ACK | 00h | 00h | N |

(N: SESSION IDENTIFIER)

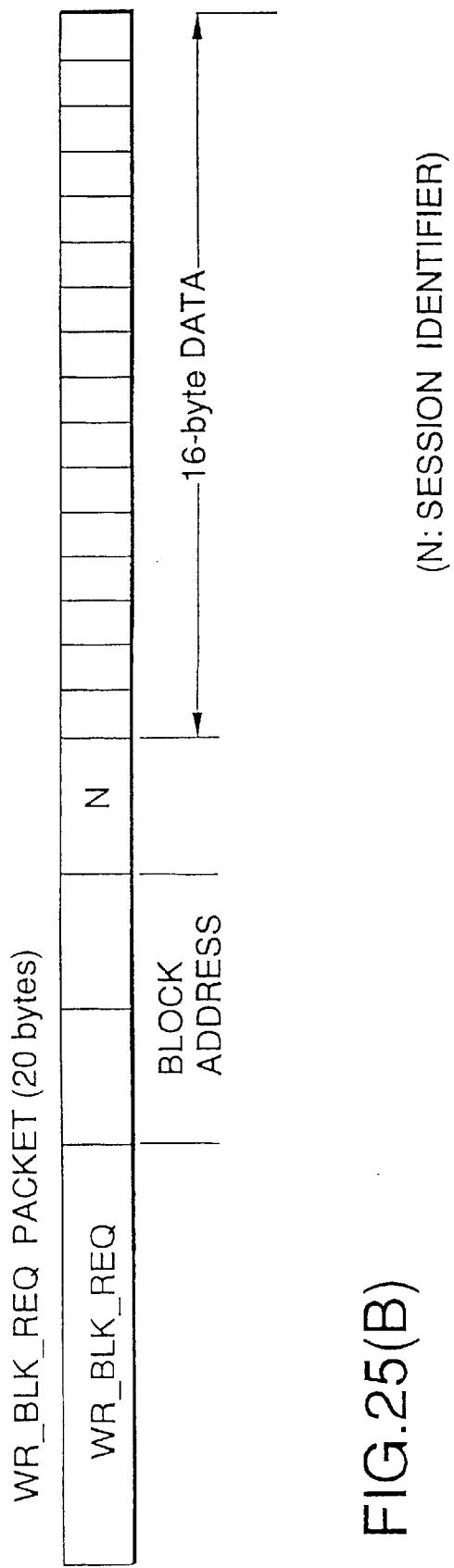
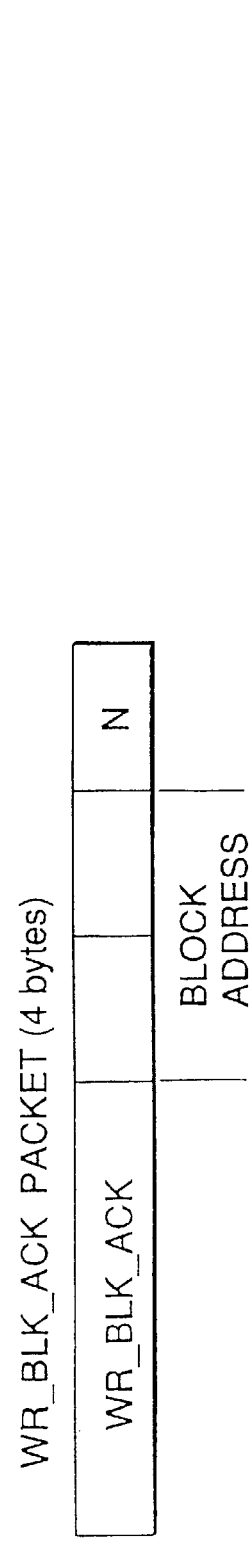
FIG.25(A)
FIG.25(B)

(N: SESSION IDENTIFIER)

FIG.27(A) SOFT_RESET_REQ PACKET (4 bytes)

| SOFT_RESET_REQ | 00h | 00h | N |
|---|---|---|---|

FIG.27(B) SOFT_RESET_ACK PACKET (4 bytes)

| SOFT_RESET_ACK | 00h | 00h | N |
|---|---|---|---|

(N: SESSION IDENTIFIER)

FIG.28(A)

MAINTENANCE_REQ PACKET (20 bytes)

| MAINTENANCE_REQ | 00h | 00h | N |

FIG.28(B)

MAINTENANCE_ACK PACKET (20 bytes)

| MAINTENANCE_ACK | 00h | 00h | N |

(N: SESSION IDENTIFIER)

RAW_WR_BLK_REQ PACKET (20 bytes)

RAW_WR_BLK_ACK PACKET (4bytes)

FIG.31

DEFINITIONS OF SESSION IDENTIFIERS

| SESSION IDENTIFIER (N) | DEFINITION |
|---|---|
| 255 | ALL REMOTE MEMORY CHIPS |
| 254~1 | SESSION IDENTIFIER |
| 0 | NO SESSION IDENTIFIER IS ASSIGNED |

OR ERROR OPERATION

METHOD AND APPARATUS FOR CONTROLLING RECORDING MEDIUM

BACKGROUND OF THE INVENTION

1. Field of the Invention

The present invention relates to an apparatus and a control method corresponding to a recording medium that is a tape cassette or the like used for such purposes as data storage and that, in particular, incorporates a non-contact-type memory.

2. Description of the Related Art

What is called the tape streaming drive is known as a drive apparatus capable of recording and reproducing digital data onto and from a magnetic tape. This tape streaming drive can have an enormous recording capacity of about tens to hundreds of gigabytes, for example, though it depends on the tape length of a tape cassette as a medium. Therefore, this tape streaming drive is widely used for such purposes as backing up data that are recorded on a medium such as a hard disk of a computer main body. Further, this tape streaming drive is considered suitable for storage of, for example, image data having a large data size.

For example, a tape streaming drive of the above type is proposed which records and reproduces data by using an 8 mm VTR tape cassette as a recording medium and employing helical scanning by a rotary head.

Incidentally, in the above magnetic tape cassette, for example, since only the tape medium is a medium for recording data, management data and system setting data, and other data (i.e., various data other than main data as subjects of storage) are also recorded on the tape.

However, in actual operations, a case frequently occurs that the user wants to read out data of a tape cassette in a state that, for example, a drive is not loaded with the tape cassette.

For example, in a library apparatus (changer apparatus) that accommodates a number of tape cassettes in magazine form and supplies selected one of those tape cassettes to a tape streaming drive, it is preferable that the apparatus be able to read out certain data from cassette bodies to identify a cassette to be transported.

To this end, for example, it has been conceived that bar code labels are attached to cassette bodies and a library apparatus or the like is allowed to recognize, for example, identification information (e.g., a cassette number) by reading bar code labels with an optical reader or the like.

However, since bar codes are not rewritable and contain only a small amount of information, the above scheme is not suitable for systems that execute relatively high-level processes.

On the other hand, in the above tape streaming system, a tape cassette has been developed that accommodates a nonvolatile memory in itself.

In this case, management information of data recording and reproduction operations on a magnetic tape, manufacture information and use history information of the cassette, and other information are recorded on the nonvolatile memory. This realizes much higher operation efficiency than in the case where management information etc. are recorded on a magnetic tape.

This is due to the following reasons. Management information etc. are required to be read out and checked every time recording or reproduction of a magnetic tape is performed, as well as to be updated after a recording or reproduction operation. Where management information etc. are recorded at a particular position (e.g., the tape top) of the magnetic tape, it is necessary to run the tape so that the particular position is located at the head-acting position, every time before and after a recording or reproduction operation. Further, this determines a position of the tape for such operations as tape loading and unloading. Recording management information etc. in a nonvolatile memory dispenses with the above operations.

The nonvolatile memory is accessed by providing the tape streaming drive with a corresponding connector terminal.

In recent years, a system has been developed in which a tape cassette is provided with not only a nonvolatile memory but also an antenna and a radio communication circuit and the nonvolatile memory is accessed in non-contact form. That is, by providing a radio communication circuit also in a tape streaming drive or the like, data can be recorded in or reproduced from the nonvolatile memory in a state that no contact is made with the tape cassette.

In the case of a tape cassette having a nonvolatile memory of a non-contact-type interface scheme, it is conceivable to perform, by using the nonvolatile memory, a data read operation that is similar to the above-described data read operation that is performed on a bar code.

For example, when the library apparatus needs to select a particular tape cassette from a magazine that accommodates a number of tape cassettes, it may read out data that are specific to the respective tape cassettes by performing a radio communication.

However, practically, the above system is difficult to implement because the system is prone to interference or the like from tape cassettes that are accommodated in the vicinity of an intended tape cassette because of the radio communication nature.

Therefore, it is also difficult to realize operations of even higher levels such as an operation that a library apparatus or the like writes management information.

SUMMARY OF THE INVENTION

The present invention has been made in view of the above circumstances, and an object of the invention is therefore to enable a recording medium control apparatus such as a library apparatus to properly perform high-level controls on a recording medium having a memory of a non-contact-type interface scheme.

To attain the above object, there is provided a recording medium control method that is executed by a recording medium control apparatus having an interface that can perform, in non-contact form, data transfer with a memory that stores identification information specific to a recording medium, the recording medium control method including a recognizing step of recognizing a recording medium by reading identification information from a memory of the recording medium; an identifier giving step of setting an identifier corresponding to the recording medium that has been recognized by the recognizing step, and giving the identifier to the memory of the recording medium; and a control step of controlling an operation on the memory of the recording medium with identification of the recording medium by using a command including the identifier.

A recording medium control apparatus to implement the above recording medium control method including an interface means that can perform data transfer with a memory in non-contact form by performing a radio communication with a communication device of a recording medium; an} identifier setting device for recognizing a recording medium by causing the interface means to read identification information from the memory of the recording medium, setting an identifier corresponding to the recognized recording medium, and causing the interface to supply the identifier to the memory means of the recording medium and write it to the memory, and a control device for controlling an operation on the memory of the recording medium with identification of the recording medium by causing the interface to output a command including the identifier.

That is, in the invention, the recording medium control apparatus performs a control by judging each recording medium based on identification information (i.e., information specific each recording medium, such as a serial number). At this time, an identifier corresponding to the identification information is set and given to each recording medium and a command that is used in performing a control is caused to include the identifier, whereby only a particular recording medium to be controlled is caused to perform an operation corresponding to the command. As a result, an event that an unintended recording medium is controlled by a command owing to interference or the like on radio interfacing is prevented.

With the above measures, not only a judgment of a recording medium but also a variety of, high-level recording and reproduction operations on the memory in a recording medium can be performed.

BRIEF DESCRIPTION OF THE DRAWINGS

FIG. 4 is a list of data that are stored in the remote memory chip of the embodiment;

FIGS. 5(A) and 5(B) show examples of a manufacturer identifier and a secondary identifier that are stored in the remote memory chip of the embodiment;

FIG. 16 is a list of commands for the remote memory chip of the embodiment;

FIGS. 17(A) and 17(B) show packets relating to an attention control of the embodiment;

FIGS. 19(A) and 19(B) show packets relating to serial number CRC code requesting of the embodiment;

FIGS. 20(A)–20(D) show packets relating to serial number specifying of the embodiment;

FIGS. 21(A) and 21(B) show packets relating to serial number CRC code specifying of the embodiment;

FIGS. 22 (A) and 22(B) show packets relating to session identifier assignment of the embodiment;

FIGS. 23 (A) and 23(B) show packets relating to session identifier requesting of the embodiment;

FIGS. 25(A) and 25(B) show packets relating to data write requesting of the embodiment;

FIGS. 26(A) and 25(B) show packets relating to data read requesting of the embodiment;

FIGS. 27(A) and 27(B) show packets relating to reset instructing of the embodiment;

FIGS. 28(A) and 28(B) show packets relating to issuance state transition instructing of the embodiment;

FIGS. 30(A) and 39(B) show packets relating to read instructing in an issuance state of the embodiment;

FIG. 31 is a table showing session identifiers of the embodiment;

DETAILED DESCRIPTION OF THE PREFERRED EMBODIMENT

Figure 1:
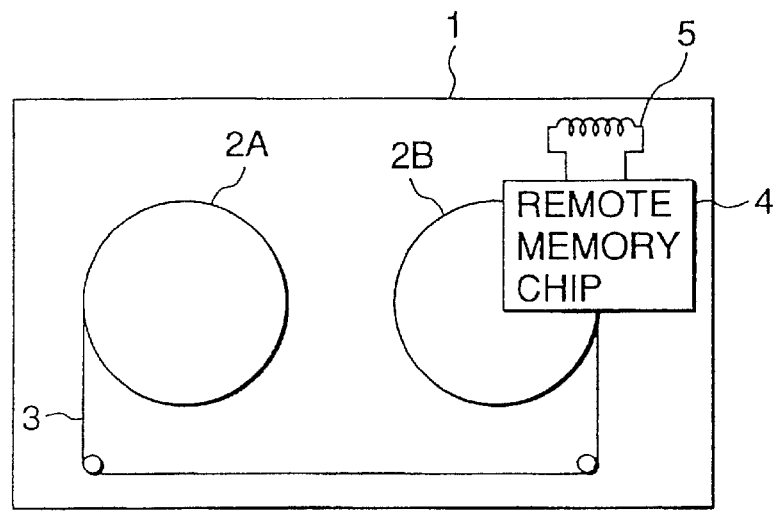
FIG. 1 schematically shows the internal configuration of a tape cassette according to an embodiment of the present invention.

An embodiment of the present invention will be hereinafter described.

This embodiment is directed to a data storage system for tape cassettes that are each provided with a nonvolatile memory, tape drive apparatuses (tape streaming drives) that correspond to the memory-incorporated tape cassettes and can record and reproduce digital data, a library apparatus that can accommodate a number of tape cassettes and mount a selected one of those into a tape streaming drive, and a host computer or the like.

The tape streaming drives and the library apparatus can write and read information onto and from the nonvolatile memory that is incorporated in a tape cassette by radio data communication.

The description will be made in the following order:
1. Configuration of tape cassette
2. Configuration of remote memory chip and data recorded therein
3. Configuration of tape streaming drive
4. Configuration of library apparatus
5. State transition of remote memory chip
6. Commands for remote memory chip
7. Session identifier assignment process
8. Data transfer process 1. Configuration of Tape Cassette First, the tape cassette corresponding to the tape streaming drive and the library apparatus according to the embodiment will be described with reference to FIGS. 1 and 2.

FIG. 1 conceptually shows the internal configuration of the tape cassette. Reels 2A and 2B are provided inside the tape cassette 1 shown in FIG. 1 and a magnetic tape 3 having a tape width of 8 mm is wound on the reels 2A and 2B to run between them.

The tape cassette 1 is provided with a remote memory chip 4 that incorporates a nonvolatile memory, its control circuit system, etc. The remote memory chip 4 can perform data transfer by radio communication with remote memory interfaces 30 of the tape streaming drives and the library apparatus (described later), and is provided with an antenna 5 for this purpose.

As described later in detail, the remote memory chip 4 stores, for each tape cassette, manufacture information and serial number information, tape thickness and length information, material information, information relating to recorded data use history or the like of respective partitions, user information, and other information.

In this specification, various kinds of information stored in the remote memory chip 4 are generically called "management information" because they are mainly used for various kinds of management of recording and reproduction operations on the magnetic tape 3.

Recording and reproduction operations on the magnetic tape 3 can be performed efficiently by providing the nonvolatile memory in the tape cassette body and storing management information in the nonvolatile memory in the above manner, and by providing the tape streaming drives corresponding to this type of tape cassette with an interface for writing and reading on the nonvolatile memory and causing the tape streaming drives to write and read management information relating to data recording or reproduction on the magnetic tape 3 onto and from the nonvolatile memory.

For example, it is not necessary to rewind the magnetic tape 3 so that, for example, the tape top is located at the head-acting position at the time of loading and unloading; that is, loading and unloading can be performed even in a state that a halfway position of the magnetic tape 3 is located at the head-acting position. Data editing etc. can be performed by rewriting the management information in the nonvolatile memory. Further, it is easy to set a number of partitions on the tape and manage those properly.

Figure 2:
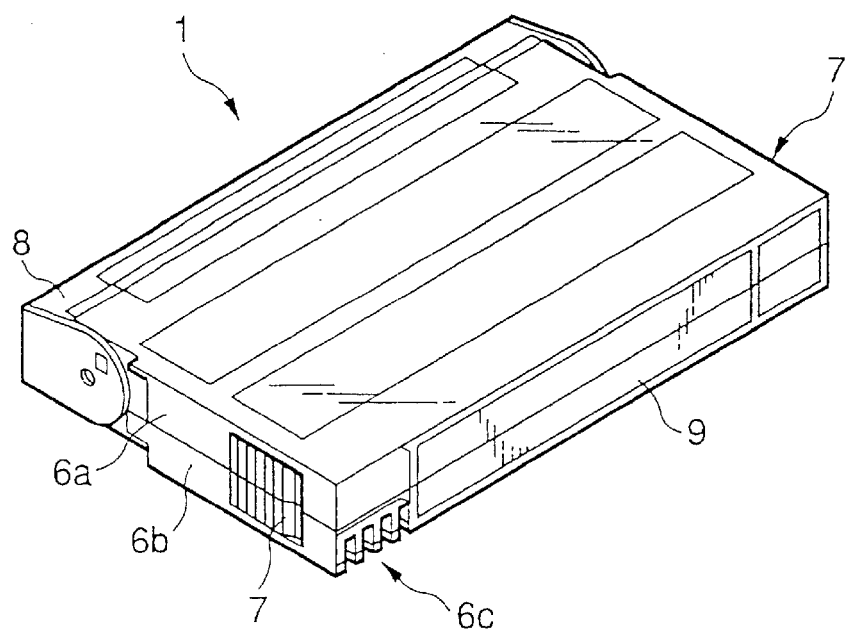
FIG. 2 is a perspective view showing an appearance of the tape cassette of the embodiment.

FIG. 2 shows an example appearance of the tape cassette 1. The entire body is composed of an upper case 6a, a lower case 6b, and a guard panel 8; the body is configured basically in the same manner as a tape cassette that is used for an ordinary 8 mm VTR.

A side label surface 9 of the tape cassette 1 is formed with a terminal portion 6c. Electrode terminals are arranged in this portion in a tape cassette of a type that incorporates a contact-type memory (not described in this embodiment). Actually, as in the case of this embodiment, the terminal portion 6c is not used in the type that incorporates the non-contact-type remote memory chip 4; it is provided merely to maintain the compatibility of the tape cassette shape with respect to apparatuses.

Both side surfaces of the body are formed with recesses 7, which are portions where the tape cassette is held when transported by the library apparatus 50 (described later), for example.

2. Configuration of Remote Memory Chip and Data Recorded Therein

Figure 3:
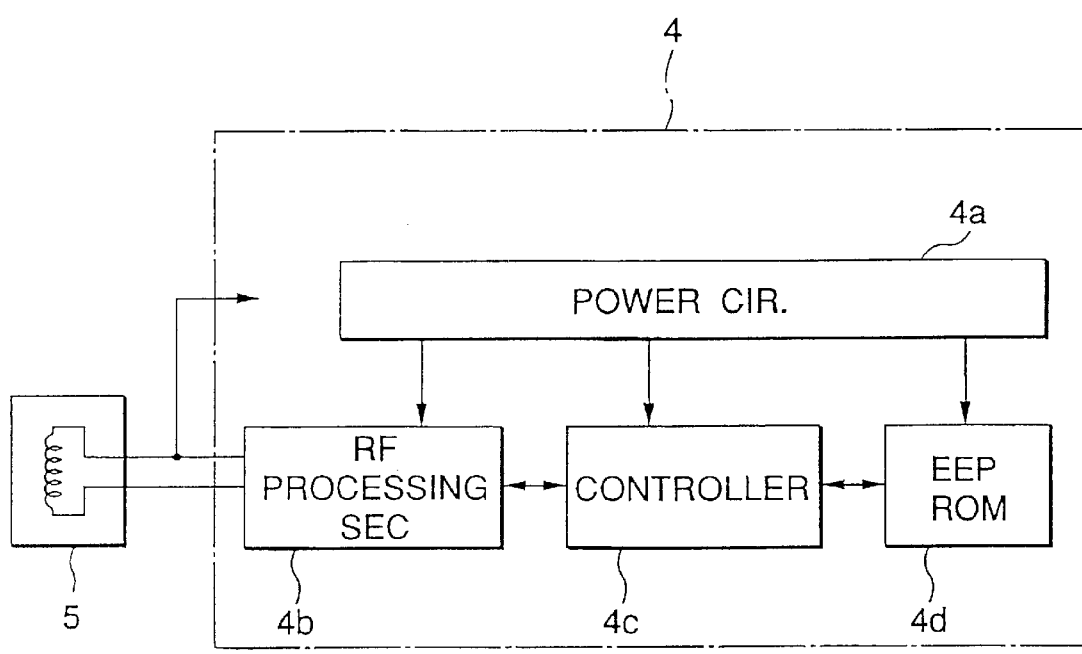
FIG. 3 is a block diagram of a remote memory chip that is provided in the tape cassette of the embodiment.

FIG. 3 shows the internal configuration of the remote memory chip 4.

For example, as shown in FIG. 3, the remote memory chip 4 is a semiconductor IC having a power circuit 4a, an RF processing section 4b, a controller 4c, and an EEPROM 4d. For example, this type of remote memory chip 4 is mounted on a printed board that is fixedly provided inside the tape cassette 1, and an antenna 5 is formed by a copper foil portion on the printed circuit board.

The remote memory chip 4 in externally supplied with electric power in non-contact form. A communication with the tape streaming drives 10 and the library apparatus 50 (described later) is performed by using a carrier wave of a 13 MHz band, for example. When the antenna 5 receives radio waves from a tape streaming drive 10 or the library apparatus 50, the power circuit 4a converts a carrier wave of the 13 MHz band to DC power and supplies it to the RF processing section 4b, the controller 4c, and the EEPROM 4d as operation power.

The RF processing section 4b demodulates received information and modulates information to be transmitted.

The controller 4c decodes a reception signal that is supplied from the RF processing section 4b and performs and controls an operation corresponding to decoded information (command), for example, writing or reading on the EEPROM 4d.

That is, the remote memory chip 4 is rendered in a power-on state upon reception of radio waves transmitted from a tape streaming drive 10 or the library apparatus 50, and then the controller 4c performs an operation that is indicated by a command that is superimposed on the carrier wave and thereby manages the data of the EEPROM 4d that is a nonvolatile memory.

FIG. 4 shows examples of management information contents to be stored in the EEPROM 4d of each tape cassette 1. Numerals (1)–(33) are used merely for convenience of description and do not correspond to a data arrangement format or the like of the EEPROM 4d. The contents listed in FIG. 4 are just examples and contents not shown in FIG. 4 may also be stored.

Each content will be described below briefly.

(1) Memory Form

This content indicates the type of the memory that is provided in the tape cassette 1 (e.g., whether it is a contact type or a non-contact type). In the remote memory chip 4 of this embodiment, a value indicating a non-contact type is stored as this content.

(2) Control Flags

Various statuses at the time of shipment from a factory are described as this content.

(3) Manufacturer Identifier

The code number of a manufacturer of the tape cassette 1 is described as this content. For example, a 1-byte code value corresponding to a manufacturer is set and stored as shown in FIG. 5(A).

(4) Secondary Identifier

Tape attribute information, that is, type information of the tape cassette 1, is described as this content. For example, 1-byte code values corresponding to respective types of the tape cassette 1 are set as shown in FIG. 5(B).

(5) Serial Number

This is a number of 32 characters (32 bytes) specific to each remote memory chip. A code specific to each tape cassette 1 is assigned thereto.

(6) CRC Code of Serial Number

A 2-byte CRC code is stored for the above 32-byte serial number.

The information of 36 bytes in total of contents (3)–(6) that are the manufacturer identifier, the secondary identifier, the serial number, and the CRC code of the serial number is data that are described at the time of shipment and specific to each tape cassette, and used for cassette authentication at the time of a session identifier assignment operation (described later).

(7) Memory Manufacture Date (8) Memory Manufacture Line Name (9) Memory Manufacture Factory Name

(10) Memory Manufacturer Name

(11) Memory Type Name

(12) Cassette Manufacture Line Name

(13) Cassette Manufacture Date

(14) Cassette Manufacture Factory Name

(15) Cassette Manufacturer Name

(16) Cassette Name

Data corresponding to the above respective contents are described.

(17) OEM Customer Name

An OEM customer name is described as this content. A description "GENERIC" is made in a case where the tape cassette 1 is for genetic customers.

(18) Tape Characteristic Specification Information

The tape thickness and length, electrical characteristics, magnetic characteristics, etc. of the magnetic tape 3 are described as this content.

(19) Maximum Communication Speed

The information transfer rate of the memory is described as this content.

(20) Block Size

The block size of the memory, such as "16 bytes," is recorded as this content.

(21) Memory Capacity

The memory capacity such as "8 KBytes" is described as this content.

(22) Read-only Region Start Address

For example, "0000h."

(23) Read-only Region End Address

For example, "00FFh."

The read-only region in the memory is defined by these contents.

(24) Various Pointers

Pointers indicating various data types on the memory. Pointers indicate a route of data types having a list structure.

(25) Memory Management Information

Management information relating to the memory is recorded as this content.

(26) Volute Attributes

Information relating to the magnetic tape 3, such as write prohibition, read prohibition, and process continuing, is described as this content.

(27) Volume Information

Information relating to the volume history of the magnetic tape 3, such as the number of partitions and the number of times of initialization, is described as this content.

(28) Volume Use History Information

Use history information of the entire cassette obtained by scrutinizing the use histories of respective partitions on the magnetic tape 3. This content includes specific information relating to the volume; it includes not only the number of times of tape loading but also the number of times of cassette loading.

(29) Fast Search Support Map Information

Data map information that is necessary for realizing a fast search function by making full use of the ability of a reel motor without acquiring ID information from the magnetic tape 3 on a real-time basis.

(30) Unload Position Information

By utilizing the memory (i.e., the remote memory chip 4), multi-partitions that are numbered from the head of the magnetic tape 3 in the increasing order can be managed efficiently. In the case of multi-partitioning, loading and unloading can be performed on a partition-by-partition basis. However, when unloading is performed on an arbitrary partition, it is necessary to check, in the next loading operation, whether loading has been performed on the position on which the preceding unloading was performed. To this end, information of an unloading position is stored in the memory. With this operation, even if loading is performed on an erroneous position, the erroneous loading is detected. In this manner, writing to an unexpected position and reading from an unexpected position can be prevented.

(31) User Free Region

A memory region on which a user can perform reading and writing freely via a host interface (SCSI) and a serial interface. The serial interface is an interface provided in the drive apparatus and used for maintenance and by the controller of the library apparatus.

(32) Reserved Region

An empty memory region for future extension.

(33) Session Identifier

As described later in detail, this content is a 1-byte identifier that is given by the corresponding apparatus (i.e., the library apparatus 50) to identify a tape cassette (remote memory chip) in data transfer for the remote memory chip 4. Although in this embodiment a session identifier is stored in the EEPROM 4$d$ of the remote memory chip 4, it is possible that the controller 4$c$ stores a session identifier in its internal register rather than the EEPROM 4$d$ (that is, the session identifier is made data that is stored and held only while an operation continues).

3. Configuration of Tape Streaming Drive

Next, the configuration of the tape streaming drive 10 of the embodiment will be described with reference to FIG. 6. The tape streaming drive 10 performs recording and reproduction on the magnetic tape 3 of the above-described tape cassette 1 according to the helical scan scheme.

Figure 6:
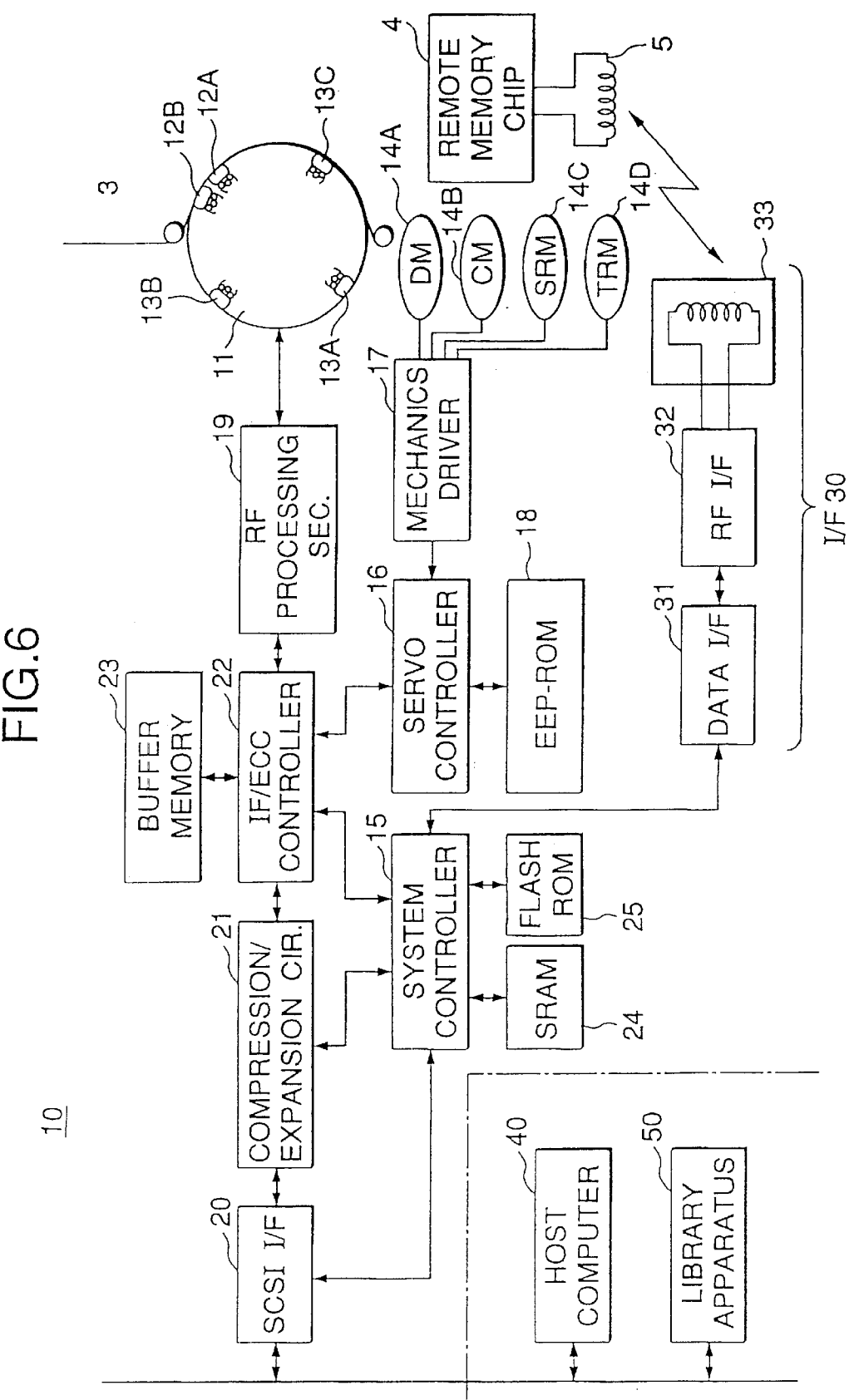
FIG. 6 is a block diagram of a tape streaming drive of the embodiment.

As shown in FIG. 6, for example, a rotary drum 11 is provided with two recording heads 12A and 12B and three reproduction heads 13A–13C. The recording heads 12A and 12B are configured in such a manner that two gaps having different azimuth angles are arranged very close to each other. The reproduction heads 13A and 13B are also heads having different azimuth angles, and are separated from each other by 90°, for example. The reproduction head 13C is used for reading that is performed immediately after recording (what is called "read after write").

The rotary drum 11 is rotated by a drum motor 14A, and part of the magnetic tape 3 that is drawn out of the tape cassette 1 is wound on the rotary drum 11. The magnetic tape 3 is fed by a capstan motor 14B and a pinch roller (not shown). As described above the magnetic tape 3 is wound on the reels 2A and 2B, which are rotated in the forward and reverse directions by respective reel motors 14C and 14D.

The drum motor 14A, the capstan motor 14B, and the reel motors 14C and 14D are rotationally driven being supplied with power from a mechanics driver 17. The mechanics driver 17 drives each motor under the control of a servo controller 16. The servo controller 16 controls the rotation speed of each motor and thereby causes a tape feed at the time of ordinary recording or reproduction or fast reproduction, a tape feed at the time of fast feeding or rewinding, etc.

An EEPROM 18 stores constants etc. that are used when the servo controller 16 servo-controls each motor.

The servo controller 16 is connected bidirectionally to a system controller 15 that controls the entire system via an interface controller/ECC formatter 22 (hereinafter referred to as "IF/ECC controller").

The tape streaming drive 10 employs a SCSI interface 20 for data input/output. For example, at the time of data recording, data are input one after another from a host computer 40 via the SCSI interface 20 in the form of fixed-length records (transmission data units) and supplied to a compression/expansion circuit 21. This type of tape streaming drive system also has a mode in which data are transmitted from the host computer 40 in the form of collections of variable-length data.

If necessary, the compression/expansion circuit 21 compresses input data according to a prescribed scheme. For example, where a compression scheme of the LZ coding is employed, dedicated codes are assigned to character strings that were processed in the past and stored in the form of a dictionary. A character string that is input later is compared with the contents of the dictionary. If an input data character string coincides with a code in the dictionary, the data of the input character string are replaced by the code in the dictionary. Data of input character strings that do not coincide with any code in the dictionary are given new codes one by one and registered in the dictionary. Data compression is effected by registering data of input character strings in a dictionary and replacing character string data with codes in the dictionary in the above-described manner.

An output of the compression/expansion circuit 21 is supplied to the IF/ECC controller 22, which temporarily stores the output of the compression/expansion circuit 21 in a buffer memory 23 by its control operation. Controlled by the IF/ECC controller 22, data accumulated in the buffer memory 23 are finally handled as data of fixed-length units (called "groups") each corresponding to 40 tracks of the magnetic tape 3. ECC formatting is performed on data in such a form.

In the ECC formatting, recording data are given error correction codes and subjected to modulation so as to become suitable for magnetic recording. Resulting data are supplied to an RF processing section 19.

The RF processing section 19 generates a recording signal by performing amplification, recording equalizing, and other operations on received recording data, and supplies the generated recording signal to the recording heads 12A and 12B. The above operations allow the recording heads 12A and 12B to record data on the magnetic tape 3.

To briefly describe a data reproducing operation, recorded data of the magnetic tape 3 are read out by the reproduction heads 13A and 13B to produce an RF reproduction signal and the reproduction output is supplied to the RF processing section 19, where it is subjected to reproduction equalizing, reproduction clock generation, binarization, decoding (e.g., Viterbi decoding), and other operations.

A signal that has been read out in this manner is supplied to the IF/ECC controller 22, where it is first subjected to error correction etc. A resulting signal is temporarily stored in the buffer memory 23, and read out at a prescribed time point and supplied to the compression/expansion circuit 21.

Based on a judgment by the system controller 15, the compression/expansion circuit 21 expands the data if they were subjected to compression in the compression/expansion circuit 21 at the time of recording. If the data were not subjected to compression in the compression/expansion circuit 21, the compression/expansion circuit 21 passes and outputs the data as they are without expanding them.

Output data of the compression/expansion circuit 21 are output, as reproduction data, to the host computer 40 via the SCSI interface 20.

FIG. 6 also shows the remote memory chip 4 in the tape cassette 1. When the tape cassette 1 main body is mounted in the tape streaming drive 10, a state is established that the system controller 15 can perform data input or output on the remote memory chip 4 in non-contact form via a remote memory interface 30. The remote memory interface 30 is provided with a data interface 31, an RF interface 32, and an antenna 33.

Figure 7:
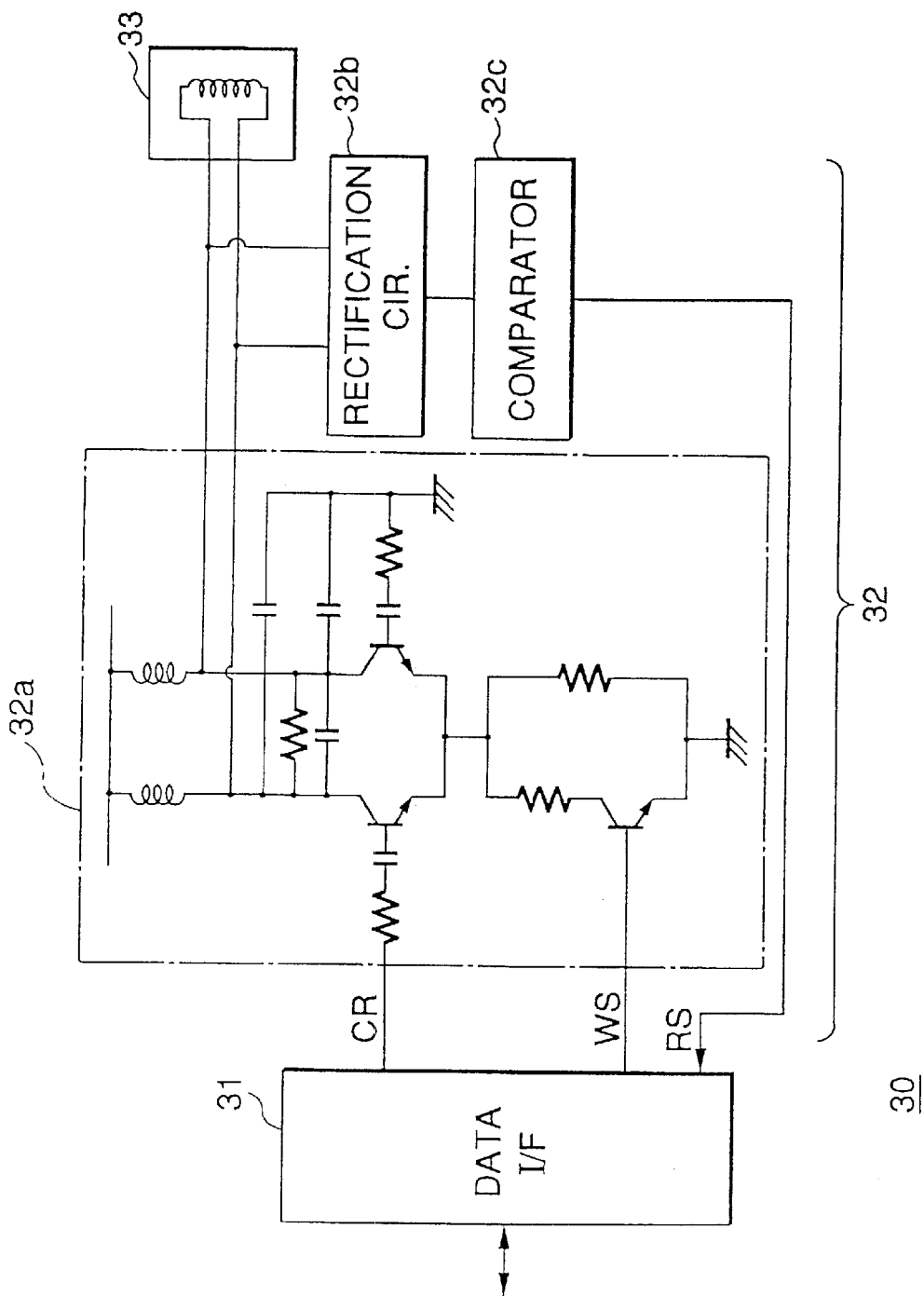
FIG. 7 is a block diagram of a remote memory interface that is provided in the tape streaming drive and a library apparatus of the embodiment.

FIG. 7 shows the configuration of the remote memory interface 30.

The data interface 31 exchanges data with the system controller 15. As described later, data transfer for the remote memory chip 4 is performed in such a manner that the apparatus side transmits a command and the remote memory chip 4 returns an acknowledgment corresponding to the command. When the system controller 15 issues a command to the remote memory chip 4, the data interface 31 receives command data and supplies it to the RF interface 32. The data interface 31 supplies a carrier wave frequency CR (wavelength: 13 MHz) to the RF interface 32.

As shown in FIG. 7, an RF modulation/amplification circuit 32a that amplitude-modulates a command (transmission data) WS at 100 KHz, superimposes modulated data on the carrier wave frequency CR, and applies a modulated signal to the antenna 33 after amplifying it is formed in the RF interface 32.

The RF modulation/amplification circuit 32a causes command data to be transmitted by radio from the antenna 33 to the antenna 5 in the tape cassette 1. In the tape cassette 1 side having the configuration described above in connection with FIG. 3, a power-on state is established as soon as command data are received by the antenna 5 and the controller 4c operates in accordance with the content of the command. For example, the controller 4c writes data that are transmitted together with a write command to the EEPROM 4d.

When a command is issued from the remote memory interface 30 in the above manner, the remote memory chip 4 issues an acknowledgment corresponding to the command. That is, the controller 4c of the remote memory chip 4 causes the RF processing section 4b to modulate and amplify data as an acknowledgment and causes the antenna 5 to transmit and output the data thus processed.

When the antenna 33 receives an acknowledgment that is transmitted in the above manner, a reception signal is rectified by a rectification circuit 32b of the RF interface 32 and then demodulated into data by a comparator 32c. The resulting data are supplied from the data interface 31 to the system controller 15. For example, if the system controller 15 issues a read command to the remote memory chip 4, the remote memory chip 4 transmits data that are read out from the EEPROM 4d, together with a code as an acknowledge corresponding to the read command. The acknowledge code and the read-out data are received and demodulated by the remote memory interface 30 and supplied to the system controller 15.

As described above, having the remote memory interface 30, the tape streaming drive 10 can access the remote memory chip 4 in the tape cassette 1.

In the above type of non-contact data exchange, although data are superimposed on a carrier wave of a 13 MHz band by amplitude modulation at 100 KHz, the original data are packetized data.

That is, data as a command or an acknowledge can be transmitted or received as a stable RF signal by packetizing the data after adding a header, a parity, and other necessary information to it and converting a resulting packet to a code.

The present assignee previously filed a patent application of a technique for realizing such a non-contact interface and the patent is granted therefor (Japanese Patent No. 2550931).

An SRAM 24 and a flash ROM 25 store data that are used by the system controller 15 for various operations.

For example, the flash ROM 25 stores constants etc. that are used for controls. The SRAM 24 serves as a work memory or a memory that is used for, for example, calculation and storage of data read out from the remote memory chip 4, data to be written to the remote memory chip 4, mode data that are set on a tape cassette basis, various flag data, and other data.

The SRAM 24 and the flash ROM 25 may be configured as internal memories of a microcomputer serving as the system controller 15. Alternatively, a certain region of the buffer memory 23 may be used as a work memory 24.

Mutual information transmission between the tape streaming drive 10 and the host computer 40 is performed by using the SCSI interface 20 in the above-described manner; the host computer 40 performs various kinds of communication with the system controller 15 by using SCSI commands.

4. Configuration of Library Apparatus

Next, the library apparatus 50 will be described.

Figure 8:
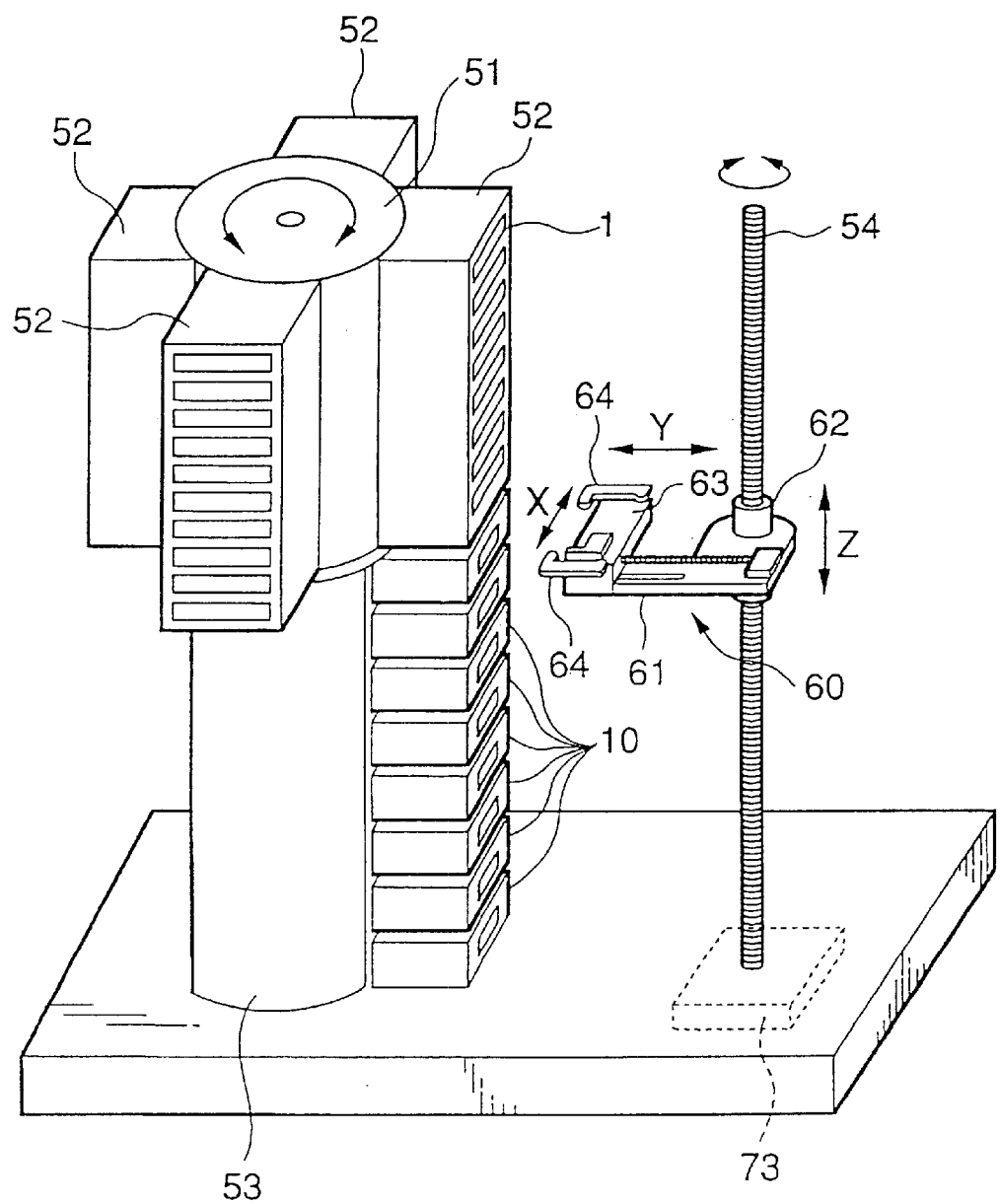
FIG. 8 is a perspective view showing the structure of the library apparatus of the embodiment.
Figure 9:
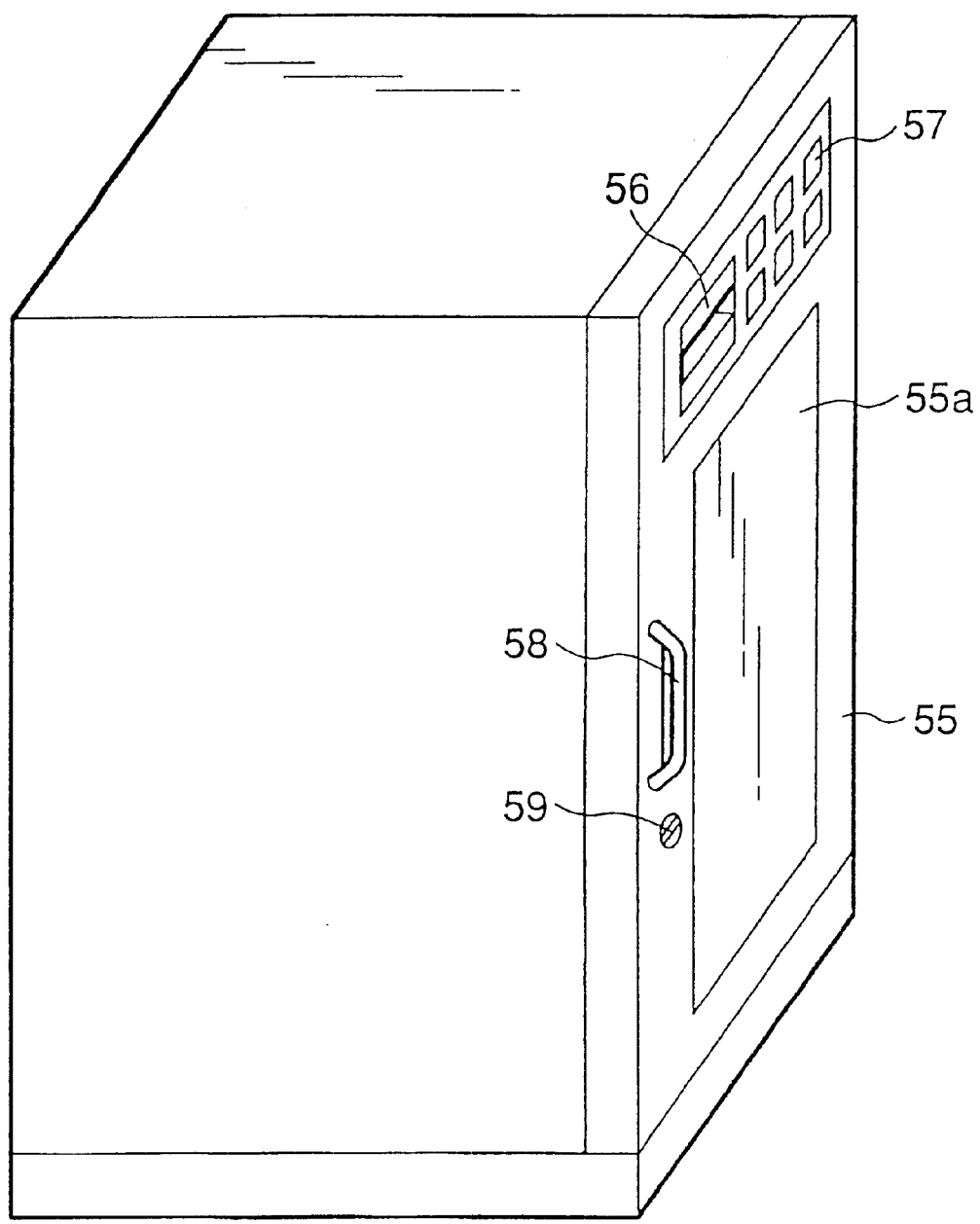
FIG. 9 is a perspective view showing the outer chassis structure of the library apparatus of the embodiment.

FIG. 9 shows an appearance of an outer chassis box of the library apparatus 50, and FIG. 8 shows a mechanism of the library apparatus 50 that is provided in the outer chassis box.

First, the mechanism of the library apparatus 50 will be described with reference to FIG. 8.

As shown in FIG. 8, in the library apparatus 50, a carousel 51 to which, for example, four magazines 52 each being capable of accommodating, for example, about 15 tape cassettes 1 are attached is rotatably provided on a controller box 53. Selection among the magazines 52 is made by rotation of the carousel 51.

A hand unit 60 for inserting and picking up a tape cassette 1 from a magazine 52 is provided so as to be movable in the vertical direction (Z-direction) along a Z-shaft 54. Specifically, the Z-shaft 54 is formed with a gear groove and a bearing portion 62 of the hand unit 60 is engaged with the gear groove. When the Z-shaft 54 is rotated by a Z-motor 73, the hand unit 60 is moved vertically.

In the hand unit 60, a hand table 63 is attached to a base 61 so as to be movable in the Y-direction. A pair of hands 64 is formed at the tip of the hand table 63. The pair of hands 64 can hold or release a tape cassette 1 by closing or opening in the X-direction.

Further, a plurality of tape streaming drives 10 are provided below the carousel 51. Each tape streaming drive 10 has the structure described above in connection with FIG. 1.

Having the above mechanism, the hand unit 60 can pick up a tape cassette 1 from a desired magazine 52 attached to the carousel 51 and can transport it to and mount it into a desired tape streaming drive 10. Conversely, the hand unit 60 can insert a tape cassette 1 that is taken from a certain tape streaming drive 10 into a desired magazine at a desired position.

As shown in FIG. 9, in the outer chassis box that accommodates the above mechanism, a front door 55 occupies most of its front side and can be opened and closed by using a handle 58. The front door 55 can be locked by means of a lock 59. Further, part of the front door 55 is a transparent panel 55a, which allows a user to see the inside.

An operation panel 57 and a mouth 56 are formed in a top portion of the front door 55. The mouth 56 is formed to enable a user to add or pick up a tape cassette 1 with the front door 55 closed. Although not shown in FIG. 8, a tape cassette 1 that is inserted through the mouth 56 can be transported to a desired position of a magazine 52 by the hand unit 60. Further, the hand unit 60 can eject, through the mouth 56, a tape cassette 1 being transported by itself.

Various keys to be manipulated by a user are arranged on the operation panel 57. Manipulation information of a key on the operation panel 57 is input to a library controller 80 described later and an operation corresponding to the manipulation is performed under the control of the library controller 80. Example manipulations to be performed by a user on the operation panel 57 are an instruction for insertion or ejection of a tape cassette 1 through the mouth 56 and an instruction for an adjustment operation on the library apparatus 50.

Figure 10:
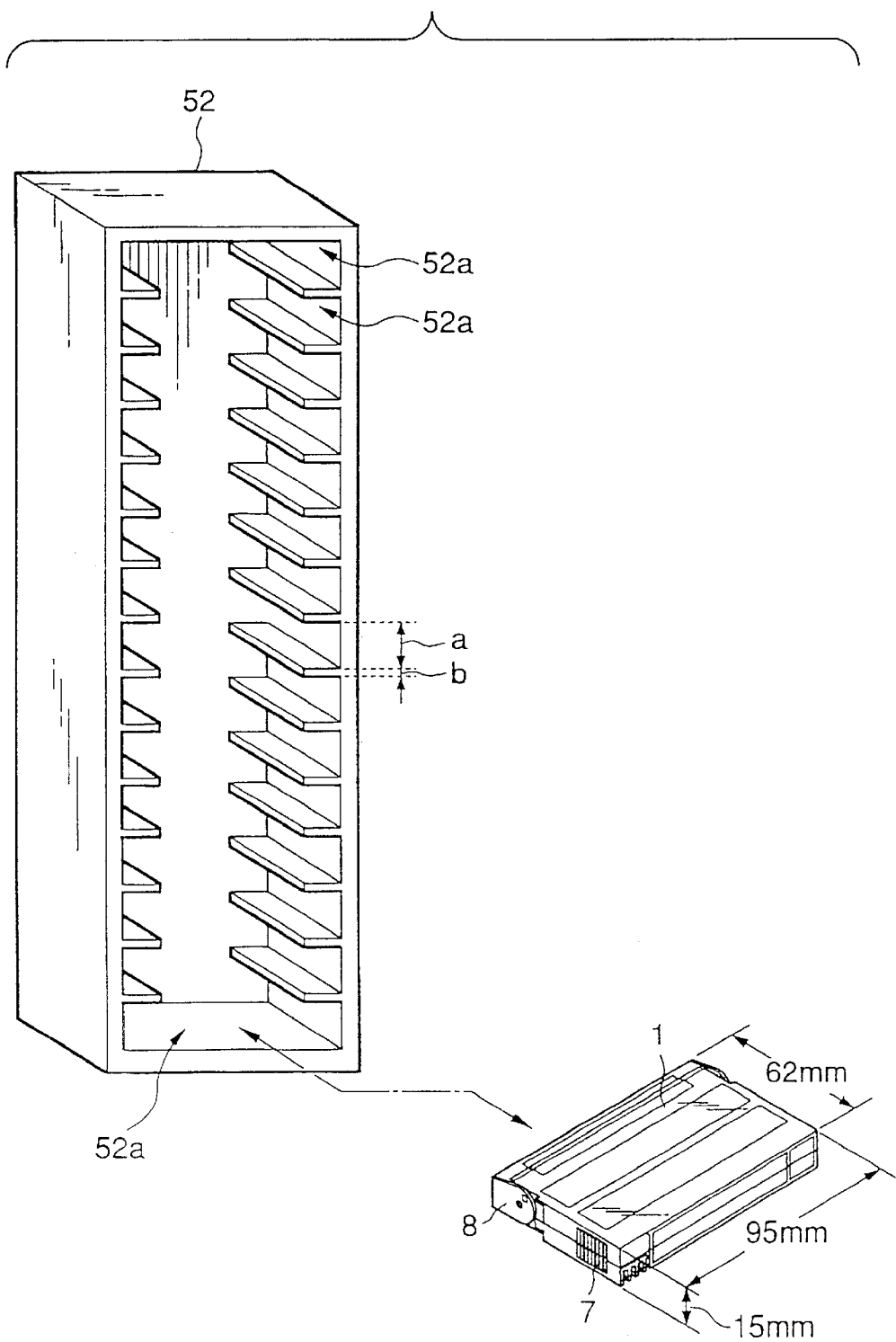
FIG. 10 is a perspective view showing a magazine of the library apparatus of the embodiment.

FIG. 10 shows the structure of the magazine 52.

Each magazine 52 is formed with about 15 accommodation units 52a, each of which can accommodate a tape cassette 1. The size of the accommodation units 52a is so set as to allow easy insertion of a tape cassette 1 and provide a certain level of force for restricting a tape cassette 1 to prevent it from falling off when, for example, the carousel 51 rotates. Further, the accommodation units 52a are so configured as to enable the hands 64 to easily pick up a tape cassette 1.

For example, the height a of each accommodation unit 52a is set at about 16 mm because the thickness of the tape cassette 1 is about 15 mm. The partition size b of the accommodation units 52a is set at, for example, about 3 mm because it should be as small as possible to form a number of accommodation units 52a and should be large enough to provide necessary strength.

Figure 11:
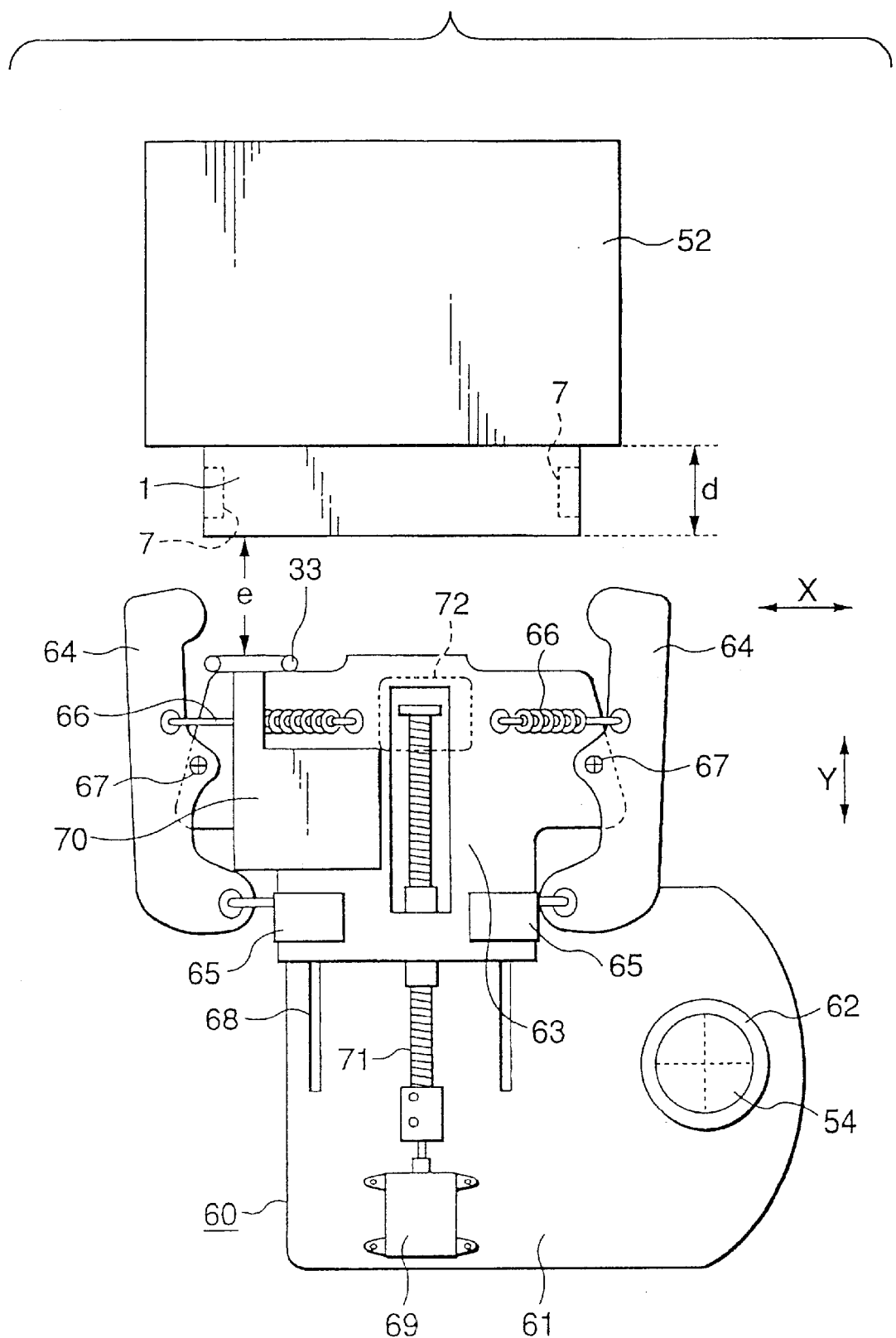
FIGS. 11 and 12 are top views showing a hand unit of the library apparatus of the embodiment.

The depth is so set that a rear portion of the tape cassette 1 somewhat projects in a state that the tape cassette 1 is accommodated in an accommodation unit 52a. That is, as shown in FIG. 11 which is a plan view showing a tape cassette 1 that is accommodated in a magazine 52, the dimension d in FIG. 11 is so set that the tape cassette 1 is accommodated in a state that its rear portion projects. For example, d is set at about 20 mm.

With the above structure, the tips of the hands 64 can easily enter the recesses 7 that are formed on both side surfaces of the tape cassette 1.

Figure 12:
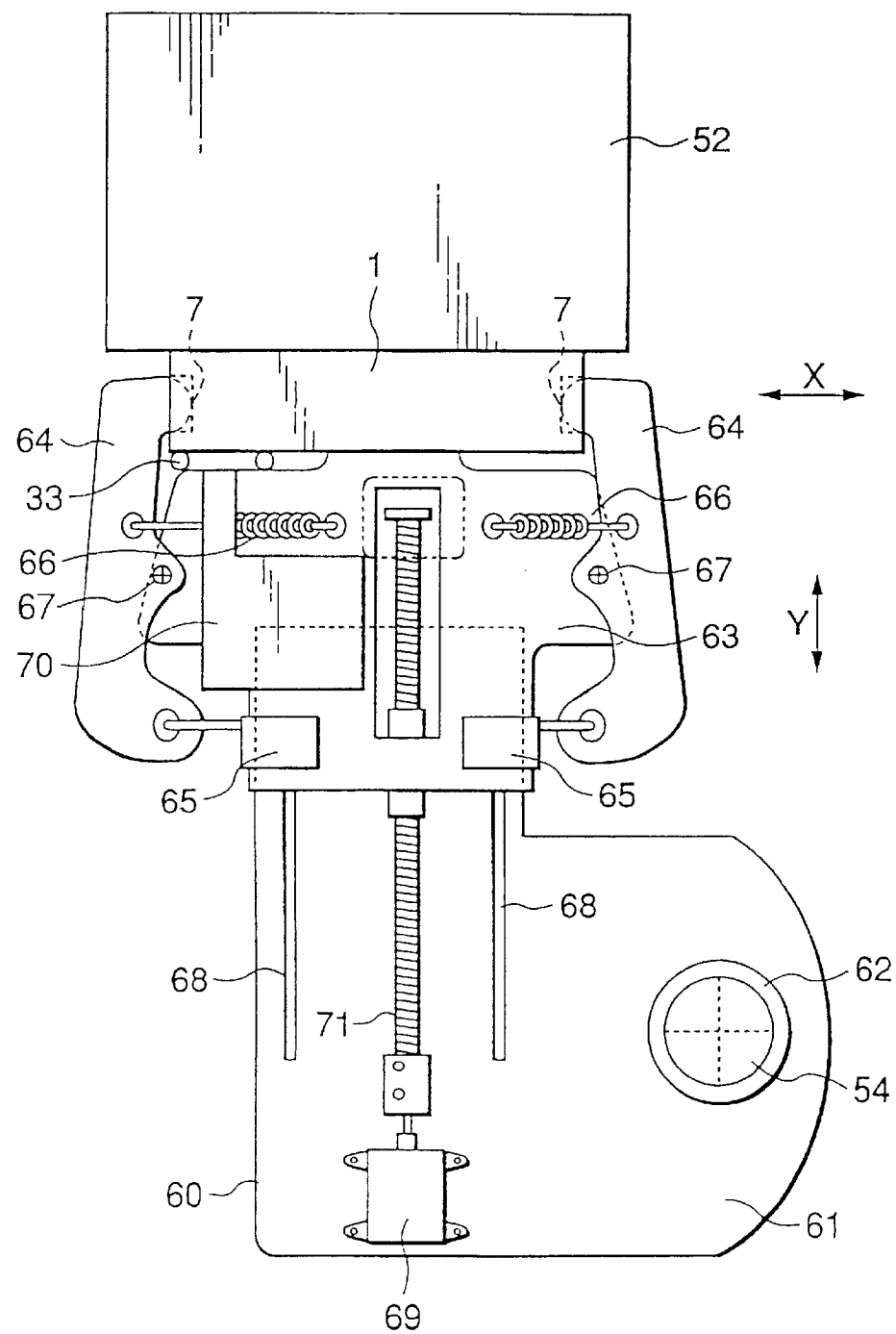
Figure 13:
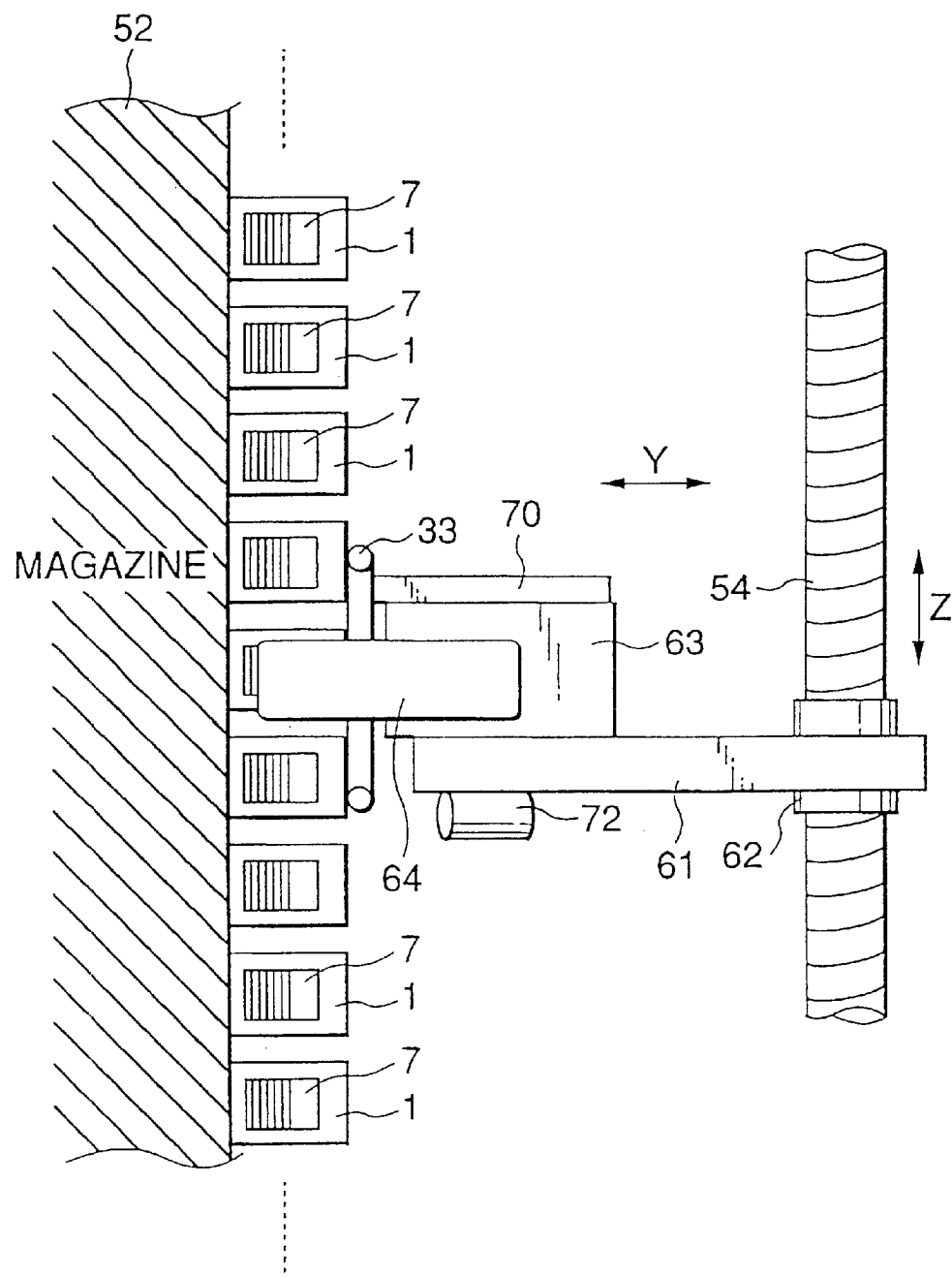
FIG. 13 is a side view showing the hand unit of the library apparatus of the embodiment.

The structure and the operation of the hand unit 60 will be described below with reference to FIGS. 11–13. FIG. 11 shows a state that the hand unit 60 is located at a position distant from a certain tape cassette 1 and faces it. FIG. 12 shows a state that the hand unit 60 grips the tape cassette 1. FIG. 13 is a side view corresponding to FIG. 12.

In the hand unit 60, as described above, the hand table 63 is movably attached to the base 61 and the hands 64 are attached to the hand table 63.

The entire hand unit 60 is held by the Z-shaft 54 in a state that the bearing portion 62 that is provided on the base 61 is engaged with the Z-shaft 54. The hand unit 60 is moved vertically by rotation of the Z-shaft 54 and thereby positioned so as to face a certain accommodation unit 52a of a magazine 52 or a certain tape streaming drive 10.

The bearing portion 62 is formed at a position that is deviated from a magazine 52 when viewed from the front door 55 side, so that the Z-shaft 54 does not obstruct an operation of inserting or picking up a tape cassette 1 into or from the magazine 52 by opening the front door 55.

The hand table 63 is movable along guide rails 68 that are formed on the base 61. Specifically, a Y-shaft 71 having a gear groove is engaged with the hand table 63. When the Y-shaft 71 is rotated by a Y-motor 69 in the normal or reverse direction, the hand table 63 is moved in the direction that it approaches or goes away from the magazine 52.

The pair of hands 64 having support shafts 67 as respective swing support points are attached to the hand table 63. The rear end portion of each hand 64 can be towed by a plunger 65, and each hand 64 is pulled, at a position close to the tip portion, from the hand table 63 by a spring 66. Therefore, during an off-period of the plungers 65, the hands 64 are closed being urged by the springs 66 as shown in FIG. 12. During an on-period of the plungers 65, the rear ends of the hands 64 are towed by the plungers 65 and hence the hands 64 are opened against the urge of the springs 66 as shown in FIG. 11.

In an operation of picking up a certain tape cassette 1 from a magazine 52, first the Z-shaft 54 is driven, whereby the hand unit 60 is moved to the height of the accommodation unit 52a where an intended tape cassette 1 is accommodated.

Then, the hands 64 are opened by the plungers 65 as shown in FIG. 11 and, in this state, the hand table 63 is moved by the Y-motor 69 in the direction that it approaches the magazine 52.

When the hand table 63 has been moved to the position of FIG. 12, the plungers 65 are turned off and hence the hands 64 are closed being urged by the springs 66. As a result, the state of FIG. 12 is established in which the hands 64 grip both side portions (recesses 7) of the tape cassette 1.

The hand unit 60 is then moved by the Y-motor 69 in the direction that it goes away from the magazine 52 while the above state is maintained, whereby the tape cassette 1 is picked up.

The tape cassette 1 thus picked up is transported by the hand unit 60 to a prescribed tape streaming drive 10, the mouth 56, another accommodation unit 52a of the magazine 52, or the like.

An operation reverse to the above is performed in placing a tape cassette 1 in a magazine 52.

Incidentally, as described above, the remote memory chip 4 is incorporated in the table cassette 1 and the library apparatus 50 can access the remote memory chip 4 the same way the tape streaming drive 10 does.

To this end, as shown in FIGS. 11–13, the hand table 63 is provided with a remote memory drive box 70, which incorporates a circuit section (similar to the circuit section as the remote memory interface 30 shown in FIG. 1) as a remote memory interface 30.

An antenna 33 is provided at a position that faces the back-side position of the tape cassette 1 where the remote memory chip 4 is disposed.

For example, in the state of FIG. 12, the antenna 33 and the remote memory chip 4 in the tape cassette 1 are very close to each other. In this state, access to the remote memory chip 4 can be made by radio communication.

In the state of FIG. 11, the antenna 33 and the remote memory chip 4 are distant from each other approximately by a distance e. Access can still be made if the distance e is within about several centimeters.

FIGS. 11–13 show a case that a bar code reader 72 is provided under the base 61. For example, where tape cassettes 1 on which bar code labels are stuck are accommodated, the bar code reader 72 provided in this manner enables readout of bar code information. In providing the bar code reader 72, no particular limitation is imposed on the relationship between the positions where the bar code reader 72 and the antenna 33 are disposed. For example, the bar code reader 72 may be disposed on the hand table 63.

Figure 14:
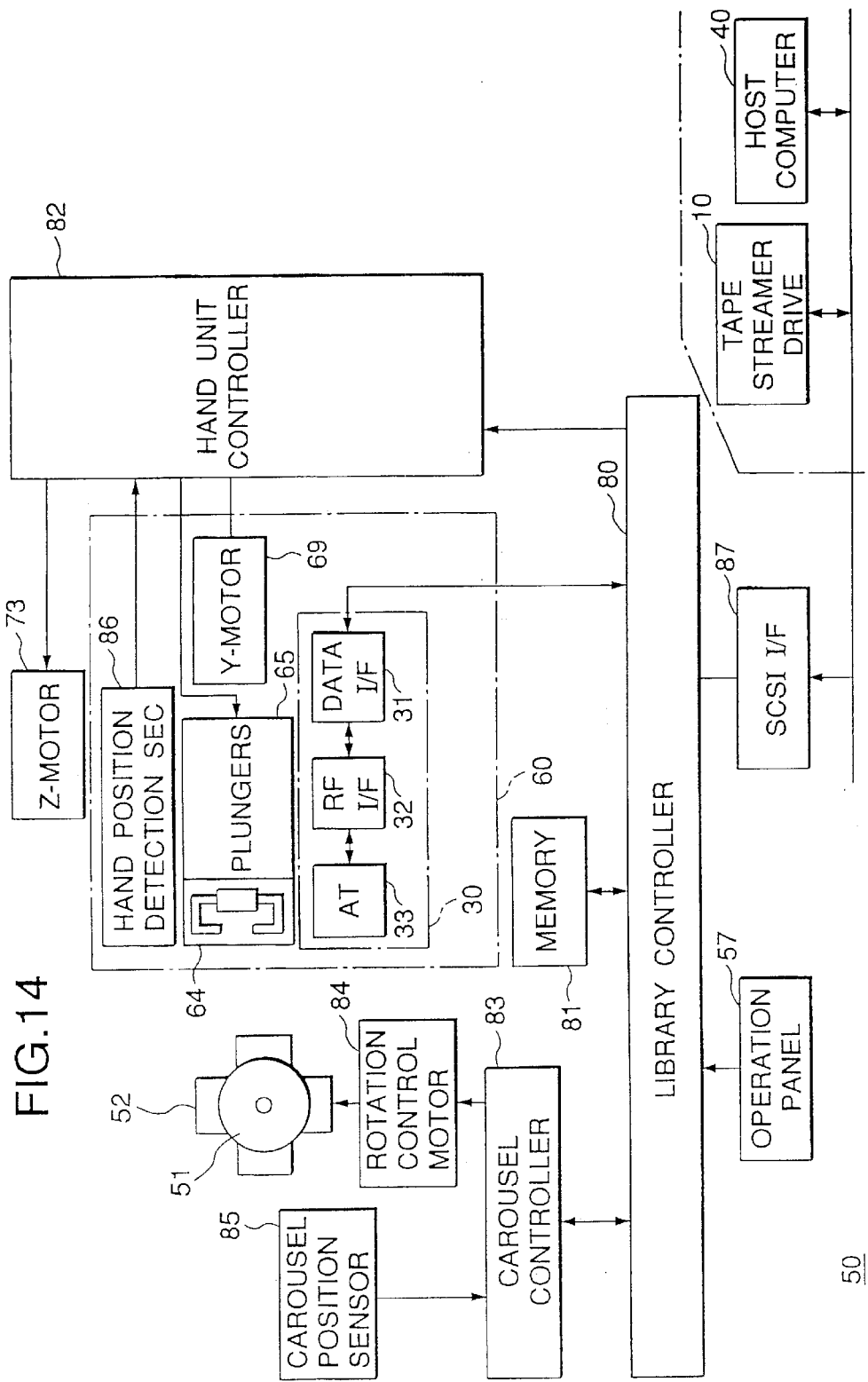
FIG. 14 is a block diagram of the library apparatus of the embodiment.

FIG. 14 shows the internal configuration of the library apparatus 50 having the above mechanism.

A library controller 80 is a section for controlling the entire library apparatus 50. The library controller 80 can communicate with the tape streaming drives 10 and the host computer 40 via a SCSI interface 87.

In accordance with a SCSI command that is sent from the host computer 40, the library controller 80 causes transport of a tape cassette 1 between the magazines 52, the tape streaming drives 10, and the mouth 56 and performs management operations on accommodated tape cassettes 1 (e.g., accesses the remote memory chip 4 in a tape cassette 1).

A memory 81 serves as a work memory that is used by the library controller 80 for its operations. As described above, manipulation information that is input through the operation panel 57 is supplied to the library controller 80, which controls a necessary operation corresponding to the manipulation.

A carousel controller 83 drives a rotation control motor 84 in accordance with an instruction from the library controller 80 and thereby rotates the carousel 51. That is, the carousel controller 83 causes an operation of selecting a magazine 52 to be faced with the hand unit 64. A carousel position sensor 85 detects the rotation position of the carousel 51, that is, detects what magazine 52 is now selected (i.e., faced with the hand unit 64). The carousel controller 83 causes selection of an intended magazine 52 by rotationally driving the carousel 51 while capturing information that is supplied from the carousel position sensor 85.

A hand unit controller 82 drives the hand unit 60 based on an instruction from the library controller 80.

That is, the hand unit controller 82 drives the Z-motor 73 and thereby moves the hand unit 60 in the Z-direction. At this time, the position of the hand unit 60 in the Z-direction is detected by a hand position detection section 86. Therefore, the hand unit controller 82 can position the hand unit 60 at a prescribed height that is specified by the library controller 80 by driving the Z-motor 73 while recognizing position detection information that is supplied from the hand position detection section 86.

Further, the hand unit controller 82 causes the hands 64 to pick up or insert a tape cassette 1 in the manner described above by driving the Y-motor 69 and the plungers 65 with prescribed timing.

As described above, the remote memory drive box 70 that is provided on the hand unit 60 incorporates the circuit section as the remote memory interface 30. Like the remote memory interface 30 (described above in connection with FIG. 6) in the tape streaming drives 10, this remote memory interface 30 consists of a data interface 31, an RF interface 32, and an antenna 33 and is configured in the same manner as shown in FIG. 7.

The remote memory interface 30 is connected to the library controller 80. Therefore, as is understood from the description that was made in connection with FIG. 7, the library controller 80 can issue a command to and thereby perform read or write access to, via the remote memory interface 30, the remote memory chip 4 in the tape cassette 1 that is accommodated in a magazine 52 and is close to the antenna 33 or that is held by the hand unit 60.

Naturally, in this case, access is established by a command issued from the library controller 80 and an acknowledge issued from the remote memory chip 4.

Although not shown in any drawing, where the bar code reader 72 is provided in the above described manner, a drive circuit system for the bar code reader 72 is provided and read-out information is supplied to the library controller 80.

5. State Transition of Remote Memory Chip

With the above-described library apparatus 50 and tape streaming drives 10, access can be made to the remote memory chip 4 in a tape cassette 1.

As described above, the remote memory chip 4 generates power based on radio waves that are received when it is accessed and it is thereby rendered in a power-on state.

Figure 15:
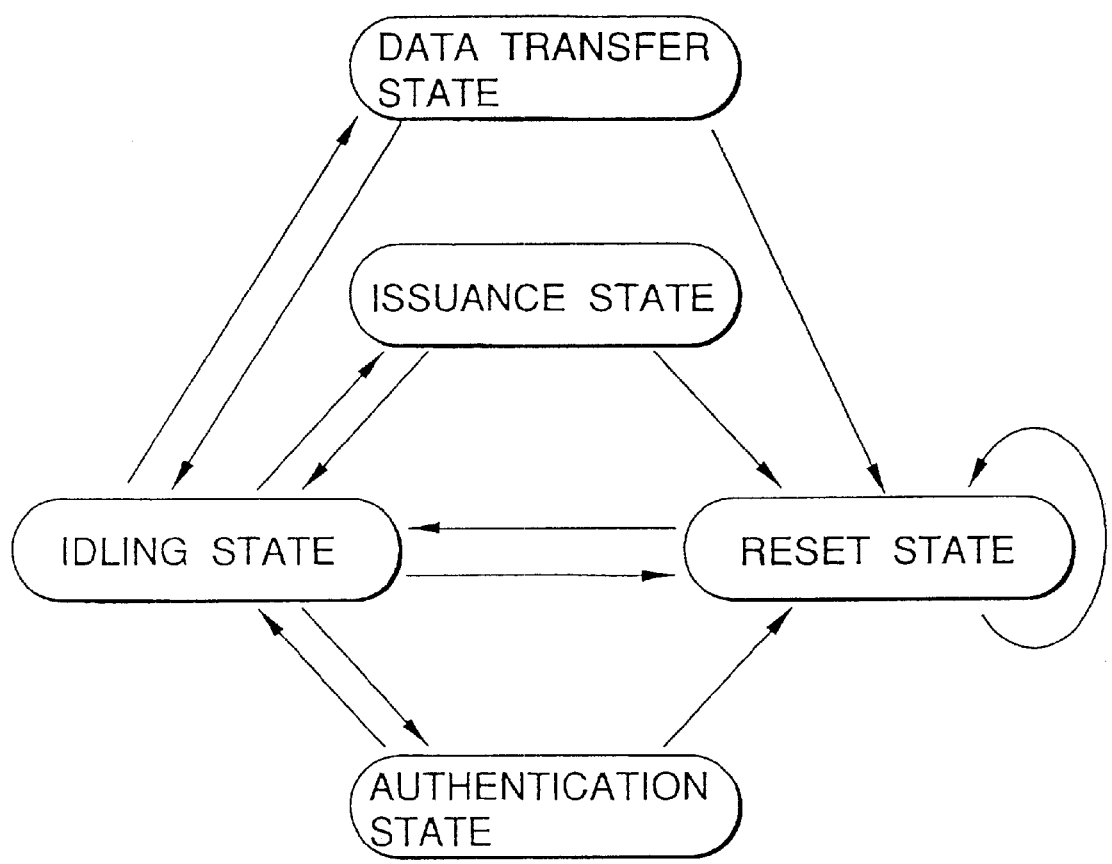
FIG. 15 is a chart showing state transitions in the remote memory chip of the embodiment.

FIG. 15 shows logical state transitions in the remote memory chip 4. As shown in FIG. 15, transitions indicated by arrows occur between five logical modes: a reset state, an idling state, an issuance state, an authentication state, and a data transfer state. These states will be described below individually.

The reset state means a state that the remote memory chip 4 is supplied with power and rendered stable. That is, the remote memory chip 4 is rendered in the reset state at a time point when the remote memory chip 4 is accessed.

The idling state is a state to which a transition is made when internal resetting of the remote memory chip 4 has completed. In the idling state, the remote memory chip 4 waits in a state that it can accept any command.

The data transfer state is a state that the remote memory chip 4 is executing a data transfer type command. As described later in detail, a command packet as a data transfer instruction that is sent from the library apparatus 50 includes a session identifier. A packet not including a session identifier is invalid.

The issuance state is a special state that writing can be performed on the read-only region (specified by a (22) read-only region start address and a (23) read-only region end address shown in FIG. 4) of the remote memory chip 4. This state relates to write and read operations that are performed only by the manufacturer side, such as serial number writing and logic formatting. A transition to the issuance state is made by a dedicated command.

The authentication state is a state in which the remote memory chip 4 is identified based on a serial number or the like and a session identifier is given to the identified remote memory chip 4. In this embodiment, the library apparatus 50 gives a session identifier, which is stored in the EEPROM 4d in the remote memory chip 4.

A process that is executed by the library apparatus 50 by rendering the remote memory chip 4 in the authentication state will be described below as a session identifier assignment process.

6. Commands for Remote Memory Chip

As described above, a communication with the remote memory chip 4 is established by a command and an acknowledge corresponding thereto. A certain command and a corresponding acknowledge have different codes. This is to avoid a trouble when, for example, the. library controller 80 issues a command to a particular one of many tape cassettes 1 that are accommodated in the magazines 52 in arrangement.

For example, the remote memory chip 4 in a particular tape cassette 1 that has received a command returns an acknowledge in response to the command. If the command and the corresponding acknowledge had the same code, there is fear that the remote memory chip 4 of a tape cassette 1 that is adjacent to the particular tape cassette 1 might recognize the acknowledge as a command. A command and a corresponding acknowledge are given different codes to avoid such an erroneous operation.

For example, a session identifier is used when the library controller 80 communicates with only the remote memory chip 4 of a particular one of many tape cassettes 1 that are accommodated adjacent to each other.

That is, the library controller 80 gives a session identifier (1-byte code) to the remote memory chip 4 of each tape cassette 1 by executing a session identifier assignment process (described later). After the assignment of a session identifier, a command is caused to include the session identifier, to allow the command to be recognized as one that is directed to the remote memory chip 4 of a particular tape cassette 1.

If a serial number or the like that is originally stored in each remote memory chip 4 is utilized (i.e., a command packet is caused to include a serial number), it is possible to recognize a command as one that is directed to a particular remote memory chip 4 even if a session identifier is not utilized. However, a code such as a serial number that is specific to each tape cassette 1 has a long data length such as 32 bytes. To include such long identification information in a command packet is disadvantageous in terms of the transmission efficiency and the apparatus configuration. Therefore, the scheme utilizing a 1-byte session identifier as in this embodiment is very effective when viewed as a command transmission scheme.

In this embodiment, the library controller 80 sets a session identifier and gives it to a remote memory chip 4. FIG. 31 shows definitions of 1-byte session identifiers used in this embodiment.

Now, 1-byte numbers "00000000" to "11111111" are expressed by numerical values "0" to "255" according to the decimal system. In this case, "0" indicates that no session identifier is assigned. That is, in the remote memory chip 4 of a tape cassette 1 that has not been subjected to the session identifier assignment process (described later), the value of the EEPROM 4d corresponding to a session identifier is "00h" (a numerical value followed by "h" is a hexadecimal value).

A numerical value "255" designates all remote memory chips 4. Numerical values "1" to "254" function as actual individual session identifiers. In the session identifier assignment process, one of "1" to "254" is selected for a subject remote memory chip 4 (for example, in such a manner that tape cassettes 1 in the library apparatus 50 do not have the same session identifier) and given to it.

FIG. 16 is a list of commands that are issued from the apparatus side (the library apparatus 50 or the tape streaming drive 10) to the remote memory chip 4 and acknowledges that are output from the remote memory chip 4 in response to the respective commands.

Packets for transmission of the respective commands and acknowledges shown in FIG. 16 will be described with reference to FIGS. 17–30. In the following description, the term "apparatus side" means the library controller 80 of the library apparatus 50 or the system controller 15 of the tape streaming drive 10. In FIGS. 17–30, a packet is described so as to be divided into 1-byte units (one box corresponds to 1 byte).

[ATTENTION REQ/ATTENTION ACK]

A command for checking whether a remote memory chip 4 is in an idling state is ATTENTION REQ, and an acknowledge with which the remote memory chip 4 that has received the command makes a report to the effect that the idling state is established is ATTENTION ACK.

FIGS. 17(A) and 17(B) show packets of the above command and acknowledge. FIG. 17(A) shows an ATTENTION REQ packet, which consists of 4 bytes. That is, it consists of a 1-byte code as an ATTENTION REQ command, 00h, 00h, and a 1-byte code as a session identifier N.

In this case, if the session identifier N is any of the values "1" to "254" the command is directed to a particular memory chip 4 that is indicated by this value. On the other hand, if the session identifier N is "255", the command is directed to indefinite remote memory chips 4. For example, the session identifier N is made "255" when the library controller 80 issues commands to the remote memory chips 4 of indefinite tape cassettes 1 in the magazines 52 or to the remote memory chips 4 of a tape cassette 1 that has not been subjected to the session identifier assignment process.

A particular or indefinite remote memory chip 4 that has received such an ATTENTION REQ packet outputs a 4-byte ATTENTION ACK packet as shown in FIG. 17(B), which consists of a 1-byte code as ATTENTION ACK, 00h, 00h, and a 1-byte code as a session identifier N. In this case, the session identifier N has the value of the session identifier of the remote memory chip 4 if assignment has already been made, and otherwise has a value "0."

[REPORT NUM H REQ, REPORT NUM L REQ/REPORT NUM H ACK, REPORT NUM L ACK]

A command for requesting a remote memory chip 4 to report the upper 16 bytes of a 32-byte serial number (see FIG. 4) is REPORT NUM H REQ, and an acknowledge that is output from the remote memory chip 4 in response to the command is REPORT NUM H ACK.

A command for requesting a remote memory chip 4 to report the lower 16 bytes of the 32-byte serial number is REPORT NUM L REQ, and an acknowledge that is output from the remote memory chip 4 in response to the command is REPORT NUM L ACK.

Figure 18A:
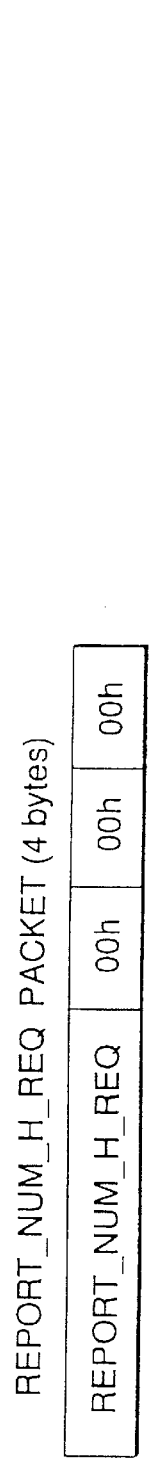
FIGS. 18(A)–18(D) show packets relating to serial number requesting of the embodiment.

FIG. 18(A) shows a REPORT NUM H REQ packet, which consists of a 1-byte code as a REPORT NUM H REQ command and 3 bytes of 00h (4 bytes in total).

Figure 18B:
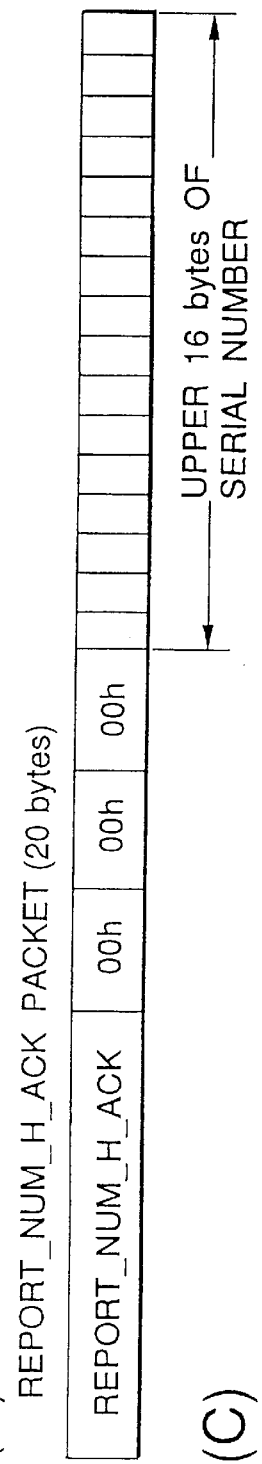

FIG. 18(B) shows a REPORT NUM H ACK packet, which is a 20-byte packet consisting of a 1-byte code as REPORT NUM H ACK, 00h, 00h, and 00h (4 bytes in total) plus the upper 16 bytes of the serial number.

Figure 18C:
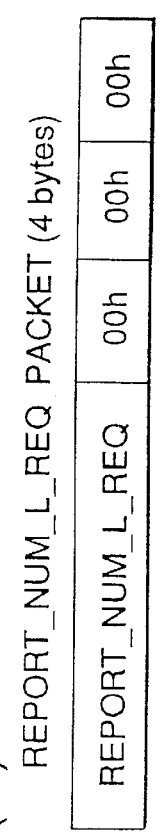

FIG. 18(C) shows a REPORT NUM L REQ packet, which consists of a 1-byte code as a REPORT NUM L REQ command and 3 bytes of 00h (4 bytes in total).

Figure 18D:
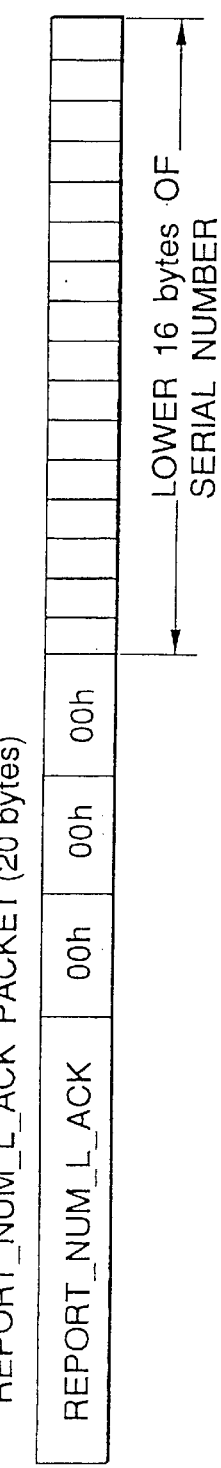

FIG. 18(D) shows a REPORT NUM L ACK packet, which is a 20-byte packet consisting of a 1-byte code as REPORT NUM L ACK, 00h, 00h, and 00h (4 bytes in total) plus the lower 16 bytes of the serial number.

By using the above commands and acknowledges, the apparatus side can obtain a 32-byte serial number from a remote memory chip 4 that is not assigned any session identifier.

[REPORT NUM CRC REQ/REPORT NUM CRC ACK]

A command for requesting a remote memory chip 4 to report a 2-byte CRC code of a serial number, a 1-byte manufacturer identifier, and a 1-byte secondary identifier (see FIG. 4) is REPORT NUM CRC REQ, and an acknowledge that is output from the remote memory chip 4 in response to the command is REPORT NUM CRC ACK.

FIG. 19(A) shows a REPORT NUM CRC REQ packet, which consists of a 1-byte code as a REPORT NUM CRC REQ command and 3 bytes of 00h (4 bytes in total).

FIG. 19(B) shows a REPORT NUM CRC ACK packet, which consists of a 1-byte code as REPORT NUM CRC ACK, 3 bytes of 00h, a 1-byte manufacturer identifier X, a 1-byte secondary identifier Y, a 2-byte CRC code, and 12 bytes of "0" (20 bytes in total).

By using the above command and acknowledge, the apparatus side can obtain a CRC code of a serial number, a manufacturer identifier, and a secondary identifier from a remote memory chip 4 that is not assigned any session identifier.

[ASSERT NUM H REQ, ASSERT NUM L REQ/ASSERT NUM H ACK, ASSERT NUM L ACK]

A command for specifying the upper 16 bytes of a 32-byte serial number (see FIG. 4) for a remote memory chip 4 is ASSERT NUM H REQ, and an acknowledge that is output from the remote memory chip 4 in response to the command is ASSERT NUM H ACK.

A command for specifying the lower 16 bytes of a 32-byte serial number for a remote memory chip 4 is ASSERT NUM L REQ, and an acknowledge that is output from the remote memory chip 4 in response to the command is ASSERT NUM L ACK.

FIG. 20(A) shows an ASSERT NUM H REQ packet, which consists of a 1-byte code as an ASSERT NUM H REQ command, 3 bytes of 00h, and the upper 16 bytes of a serial number (20 bytes in total).

FIG. 20(B) shows an ASSERT NUM H ACK packet, which consists of a 1-byte code as ASSERT NUM H ACK and 3 bytes of 00h (4 bytes in total).

FIG. 20(C) shows an ASSERT NUM L REQ packet, which consists of a 1-byte code as an ASSERT NUM L REQ command, 3 bytes of 00h, and the lower 16 bytes of a serial number (20 bytes in total).

FIG. 20(D) shows an ASSERT NUM L ACK packet, which consists of a 1-byte code as ASSERT NUM L ACK and 3 bytes of 00h (4 bytes in total).

By using the above commands and acknowledges, the apparatus side can designate a tape cassette 1 (i.e., a remote memory chip 4) by specifying a serial number.

[ASSERT NUM CRC REQ/ASSERT NUM CRC ACK]

A command for specifying a 2-byte CRC code of a serial number, a 1-byte manufacturer identifier, and a 1-byte secondary identifier (see FIG. 4) for a remote memory chip 4 is ASSERT NUM CRC REQ, and an acknowledge that is output from the remote memory chip 4 in response to the command is ASSERT NUM CRC ACK.

FIG. 21(A) shows an ASSERT NUM CRC REQ packet, which consists of a 1-byte code as an ASSERT NUM CRC REQ command, 3 bytes of 00h, a 1-byte manufacturer identifier X, a 1-byte secondary identifier Y, a 2-byte CRC code, and 12 bytes of "0" (20 bytes in total).

FIG. 21(B) shows an ASSERT NUM CRC ACK packet, which consists of a 1-byte code as ASSERT NUM CRC ACK and 3 bytes of 00h (4 bytes in total).

By using the above command and acknowledge, the apparatus side can specify, together with a serial number (described above), a CRC code of the serial number, a manufacturer identifier, and a secondary identifier.

[ASSIGN SID REQ/ASSIGN SID ACK]

A command for assigning a session identifier to a remote memory chip 4 is ASSIGN SID REQ, and an acknowledge that is output from the remote memory chip 4 in response to the command is ASSIGN SID ACK.

FIG. 22(A) shows an ASSIGN SID REQ packet, which consists of a 1-byte code as an ASSIGN SID REQ command, 2 bytes of 00h, and 1 byte as a session identifier N to be assigned (4 bytes in total).

FIG. 22(B) shows an ASSIGN SID ACK packet, which consists of a 1-byte code as ASSIGN SID ACK, 2 bytes of 00h, and 1 byte as an assigned session identifier N (4 bytes in total).

By using the above command and acknowledge, the apparatus side can assign a session identifier to a remote memory chip 4.

[REPORT SID REQ/REPORT SID ACK]

A command for requesting a particular remote memory chip 4 or indefinite remote memory chips 4 to report a session identifier is REPORT SID REQ, and an acknowledge that is output from the particular remote memory chip 4 or the indefinite remote memory chips 4 in a response to the command is REPORT SID ACK.

FIG. 23(A) shows a REPORT SID REQ packet, which consists of a 1-byte code as a REPORT SID REQ command, 2 bytes of 00h, and 1 byte as a session identifier N (4 bytes in total). In the case of a command for a particular remote memory chip 4, the value of the session identifier of the remote memory chip 4 is inserted as the session identifier N. In the case of a command for indefinite remote memory chips 4, "255" is inserted as the session identifier N.

FIG. 23(B) shows a REPORT SID ACK packet, which consists of a 1-byte code as REPORT SID ACK, 2 bytes of 00h, and 1 byte as a session identifier N to be reported (4 bytes in total). In the case of a remote memory chip 4 that is assigned no session identifier, "0" is set as the session identifier N to be reported.

By using the above command and acknowledge, the apparatus side can cause a remote memory chip 4 to report a session identifier.

[STAT REQ/STAT ACK]

A command for requesting a particular remote memory chip 4 or indefinite remote memory chips 4 to report its or their status(es) is STAT REQ, and an acknowledge that is output from the particular remote memory chip 4 or the indefinite remote memory chips 4 in response to the command is STAT ACK.

Figure 24A:
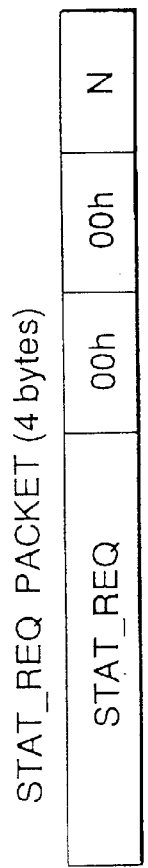
FIGS. 24(A) and 24(B) show packets relating to status report requesting of the embodiment.

FIG. 24(A) shows a STAT REQ packet, which consists of a 1-byte code as a STAT REQ, 2 bytes of 00h, and 1 byte as a session identifier N (4 bytes in total). In the case of a command for a particular remote memory chip 4, the value of the session identifier of the remote memory chip 4 is inserted as the session identifier N. In the case of a command for indefinite remote memory chips 4, "255" is inserted as the session identifier N.

Figure 24B:
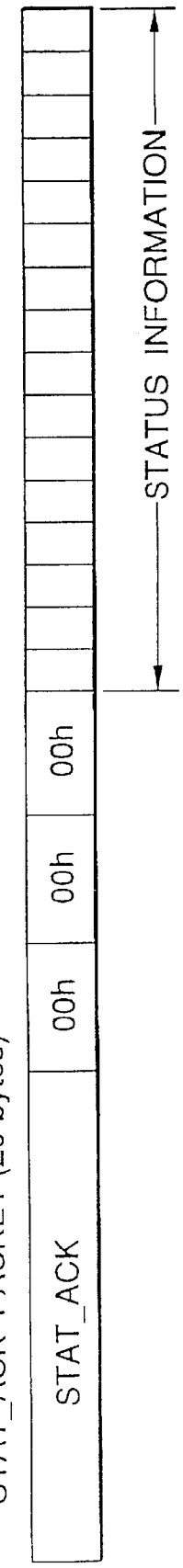

FIG. 24(B) shows a STAT ACK packet, which consists of a 1-byte code as STAT ACK, 3 bytes of 00h, and 16 bytes as status information to be reported (20 bytes in total).

By using the above command and acknowledge, the apparatus side can cause a remote memory chip 4 to report its status.

[WR BLK REQ/WR BLK ACK]

A command for instructing a particular remote memory chip 4 to write data is WR BLK REQ, and an acknowledge that is output from the remote memory chip 4 in response to the command is WR BLK ACK.

FIG. 25(A) shows a WR BLK REQ packet, which consists of a 1-byte code as a WR BLK REQ command, a 2-byte block address that specifies a write position, 1 byte as a session identifier N that specifies a particular remote memory chip 4, and 16 bytes as actual write data (20 bytes in total).

FIG. 25(B) shows a WR BLK ACK packet, which consists of a 1-byte code as WR BLK ACK, a 2-byte block address as a specified write address, and 1 byte as a session identifier N (4 bytes in total).

By using the above command and acknowledge, the apparatus side can transmit a write address and write data by specifying a particular remote memory chip 4 by a session identifier and write the write data onto the EEPROM 4d of the remote memory chip 4.

[RD BLK REQ/RD BLK ACK]

A command for instructing a particular remote memory chip 4 to read data is RD BLK REQ, and an acknowledge that is output from the remote memory chip 4 in response to the command is RD BLK ACK.

Figure 26A:
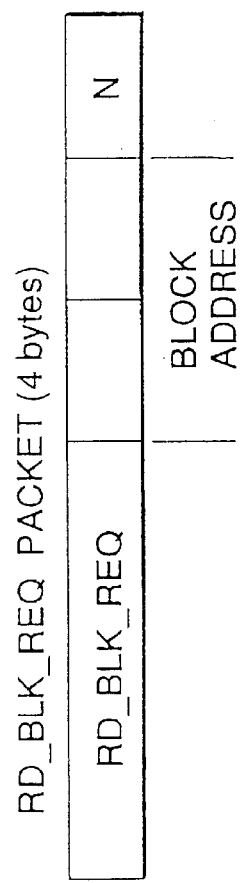

FIG. 26(A) shows a RD BLK REQ packet, which consists of a 1-byte code as a RD BLK REQ command, a 2-byte block address that specifies a read position, and 1 byte as a session identifier N that specifies a particular remote memory chip 4 (4 bytes in total).

Figure 26B:
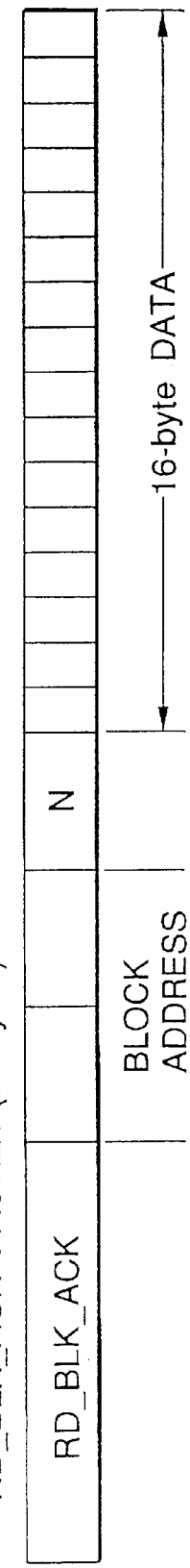

FIG. 26(B) shows a RD BLK ACK packet, which consists of a 1-byte code as WR BLK ACK, a 2-byte block address as a specified read position, 1 byte as a session identifier N, and 16 bytes as read-out data (20 bytes in total).

By using the above command and acknowledge, the apparatus side can specify a particular remote memory chip 4 and a read address by a session identifier and read necessary data from the EEPROM 4d of the remote memory chip 4.

[SOFT RESET REQ/SOFT RESET ACK]

A command for software-resetting a particular remote memory chip 4, that is, forcibly causing it to make a transition to a reset state, is SOFT RESET REQ, and an acknowledge that is output from the remote memory chip 4 in response to the command is SOFT RESET ACK.

FIG. 27 (A) shows a SOFT RESET REQ packet, which consists of a 1-byte code as a SOFT RESET REQ command, 2 bytes of 00h, and 1 byte as a session identifier N that specifies a particular remote memory chip 4 (4 bytes in total).

FIG. 27(B) shows a SOFT RESET ACK packet, which consists of a 1-byte code as SOFT RESET ACK, 2 bytes of 00h, and 1 byte as a session identifier N (4 bytes in total).

By using the above command and acknowledge, the apparatus side can cause a particular remote memory chip 4 to make a transition to a reset state while continuing to apply power to it.

[MAINTENANCE REQ/MAINTENANCE ACK]

A command for causing a remote memory chip 4 to make a transition to an issuance state is MAINTENANCE REQ, and an acknowledge that is output from the remote memory chip 4 in response to the command is MAINTENANCE ACK.

FIG. 28(A) shows a MAINTENANCE REQ packet, which consists of a 1-byte code as a MAINTENANCE REQ command, 2 bytes of 00h, 1 byte as a session identifier N, and 16 bytes as prescribed data (20 bytes in total).

FIG. 28(B) shows a MAINTENANCE ACK packet, which consists of a 1-byte code as MAINTENANCE ACK, 2 bytes of 00h, 1 byte as a session identifier N, and 16 bytes as prescribed data (20 bytes in total).

By using the above command and acknowledge, the apparatus side can cause a particular remote memory chip 4 to make a transition to an issuance state.

[RAW WR BLK REQ/RAW WR BLK ACK]

A command for instructing a remote memory chip 4 that has been rendered in an issuance state by the above MAINTENANCE REQ command to write data is RAW WR BLK REQ, and an acknowledge that is output from the remote memory chip 4 in response to the command is RAW WR BLK ACK.

Figure 29A:
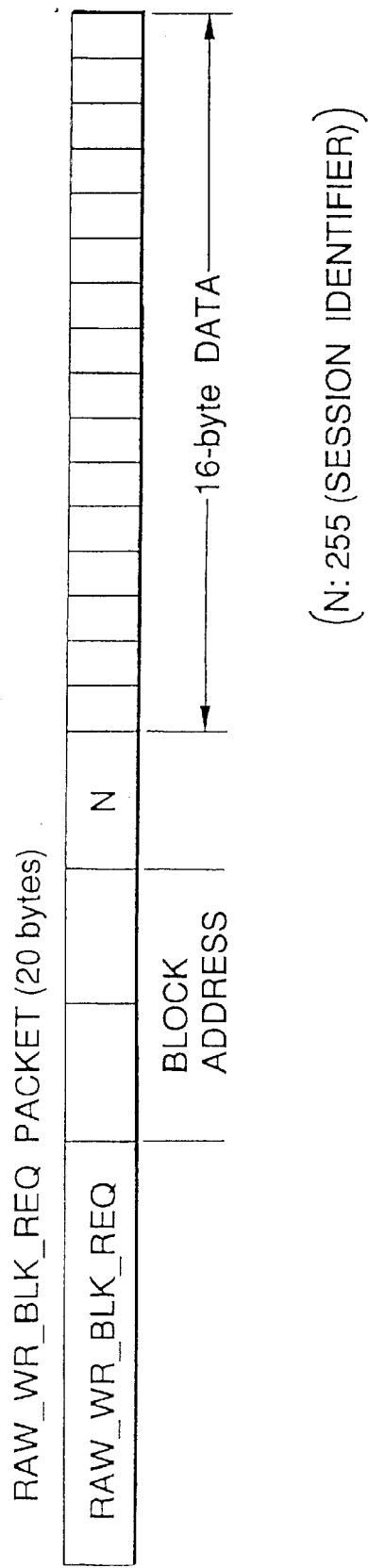
FIGS. 29(A) and 29(B) show packets relating to write instructing in an issuance state of the embodiment.

FIG. 29(A) shows a RAW WR BLK REQ packet, which consists of a 1-byte code as a RAW WR BLK REQ command, a 2-byte block address that specifies a write position, 1 byte as a session identifier N, and 16 bytes as actual write data (20 bytes in total).

Figure 29B:
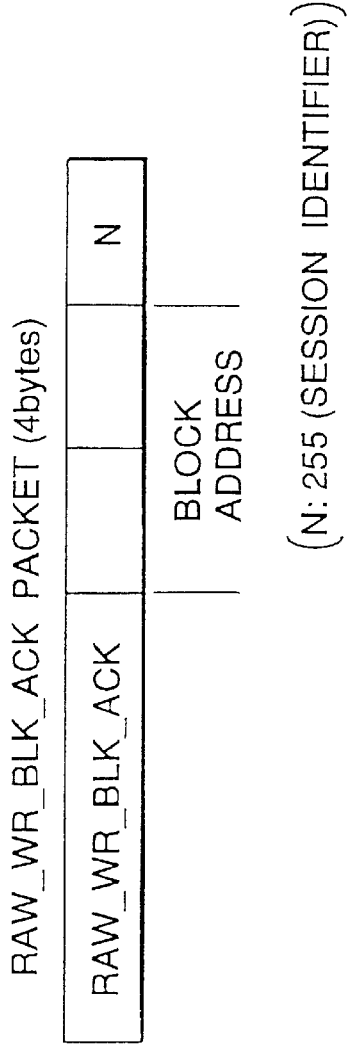

FIG. 29(B) shows a RAW WR BLK ACK packet, which consists of a 1-byte code as RAW WR BLK ACK, and a 2-byte block address as a specified write position, and 1 byte as a session identifier N (4 bytes in total).

By using the above command and acknowledge, the apparatus side can transmit a write address and write data to a remote memory chip 4 that is in an issuance state and write data in the EEPROM 4d of the remote memory chip 4. This is a write operation on a region that is usually write-disabled, and is used in serial number writing and logic formatting, for example.

In processes of this kind in which a remote memory chip 4 is in an issuance state, usually "255" is set as a session identifier N.

[RAW RD BLK REQ/RAW RD BLK ACK]

A command for instructing a remote memory chip 4 that has been rendered in an issuance state by the above MAINTENANCE REQ command to read data is RAW RD BLK REQ, and an acknowledge that is output from the remote memory chip 4 in response to the command is RAW RD BLK ACK.

Figure 30A:
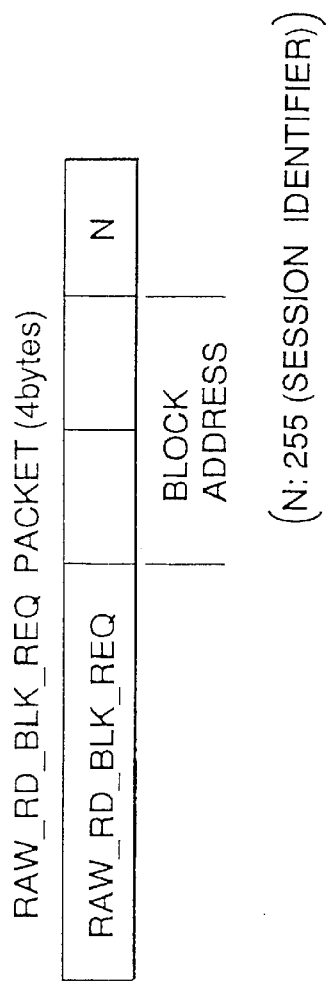

FIG. 30(A) shows a RAW RD BLK REQ packet, which consists of a 1-byte code as a RAW RD BLK REQ command, a 2-byte block address that specifies a read position, and 1 byte as a session identifier N (4 bytes in total).

Figure 30B:
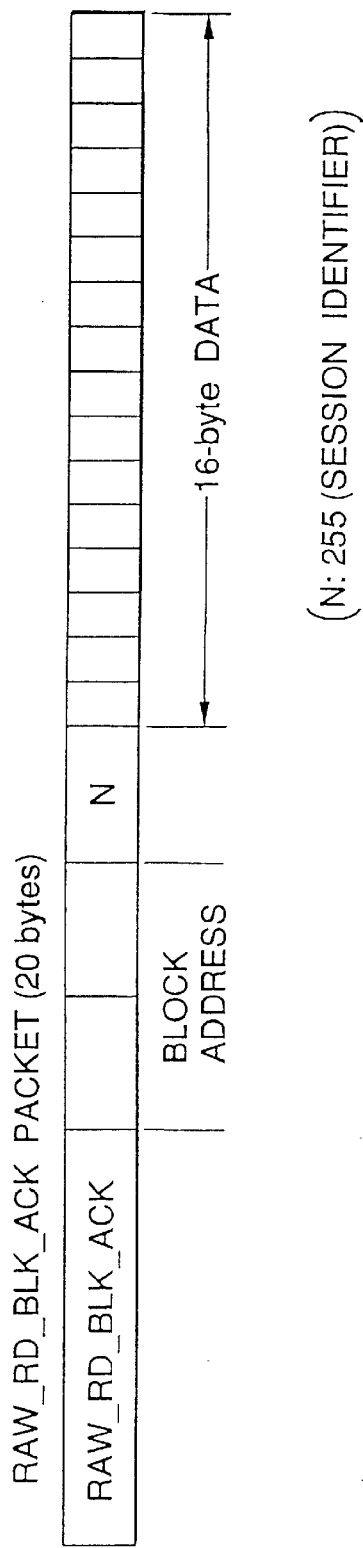

FIG. 30(B) shows a RAW RD BLK ACK packet, which consists of a 1-byte code as RAW RD BLK ACK, and a 2-byte block address as a specified read position, 1 byte as a session identifier N, and 16 bytes as read-out data (20 bytes in total).

By using the above command and acknowledge, the apparatus side can specify an address of a remote memory chip 4 that is in an issuance state and read data from the EEPROM 4*d* of the remote memory chip 4. Also in this case, usually "255" is set as a session identifier N.

The commands and acknowledges have been described above one by one. The library apparatus 50 and the tape streaming drives 10 can perform any of various kinds of access by outputting a proper one of those commands to a remote memory chip 4 via the remote memory interface 30 and receiving an acknowledge.

7. Session Identifier Assignment Process

As described above, the library controller 80 of the library apparatus 50 uses a session identifier to communicate with only the remote memory chip 4 of a particular one of many tape cassettes 1 that are accommodated adjacent to each other in the magazines 52.

Figure 32:
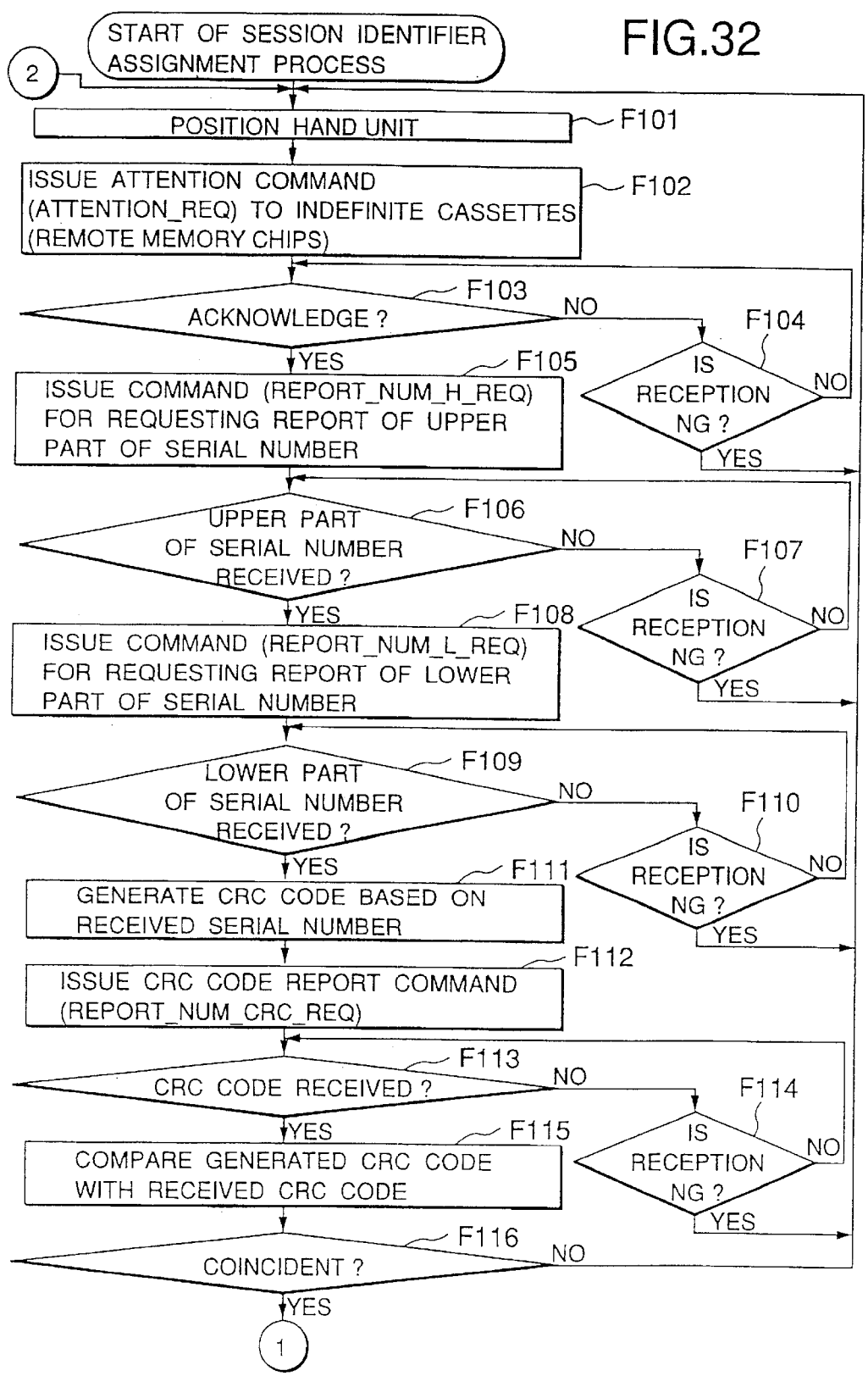
FIGS. 32 and 33 are a flowchart of a session identifier assignment process of the embodiment.
Figure 33:
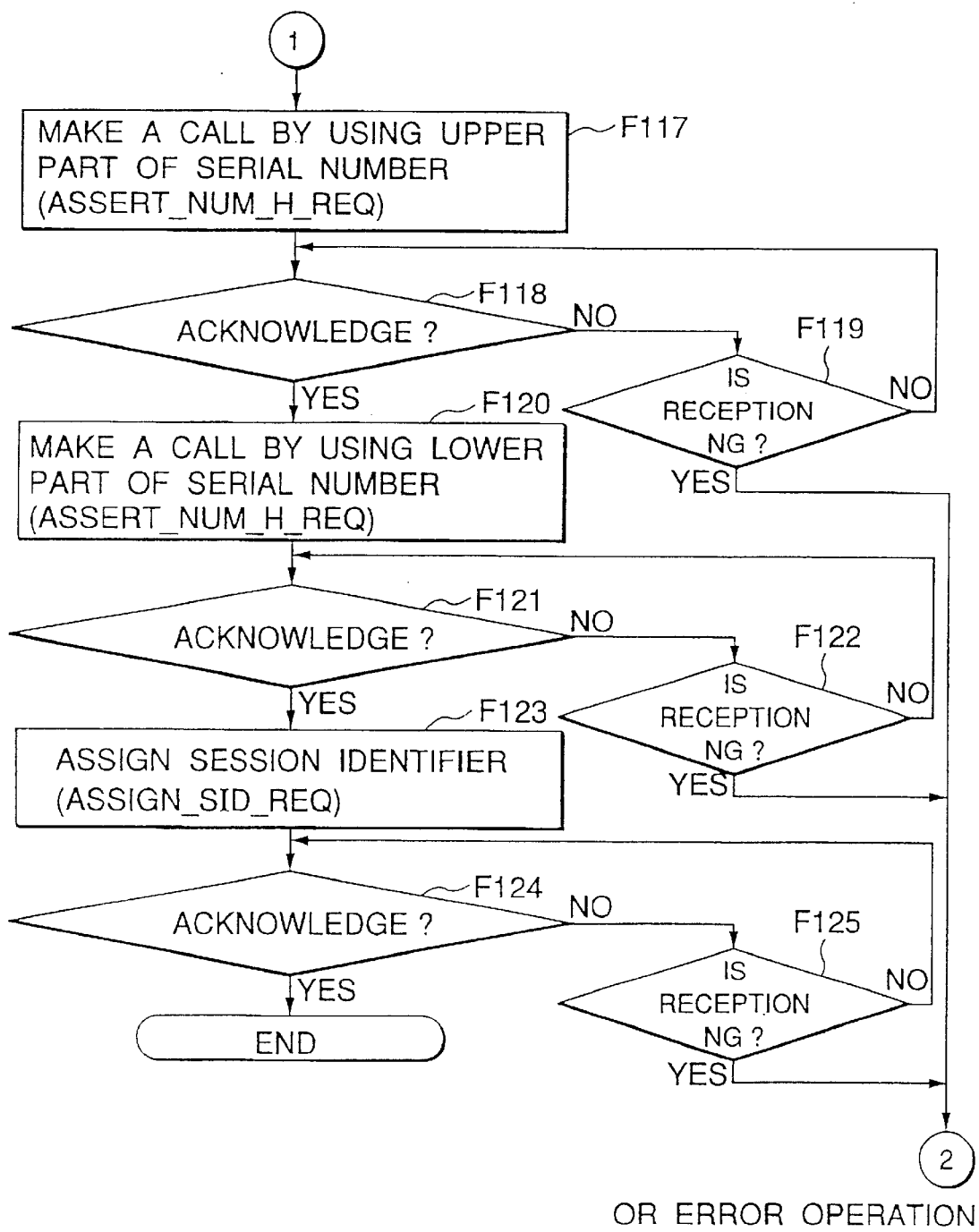

To this end, it is necessary that session identifiers be assigned to the respective tape cassettes 1. A session identifier assignment process for this purpose will be described with reference to FIGS. 32 and 33. FIGS. 32 and 33 are a flowchart of a session identifier assignment process that is executed by the library controller 80 via the remote memory interface 30 on the remote memory chip 4 in a certain tape cassette 1.

Step F101 is a step for positioning the hand unit 60 with respect to a tape cassette 1 that is to be assigned a session identifier. That is, this is a step of controlling the Z-motor 73 so that the hand unit 60 is moved to a height where a target tape cassette 1 is accommodated. Naturally, a rotation control on the carousel 51 is performed when necessary.

When the hand unit 60 has been positioned so as to face the target tape cassette 1, at step F102 an attention command is issued to indefinite tape cassettes 1. This is a step of outputting the above-described ATTENTION REQ command. Since no session identifier has been assigned at this time point, the session identifier N in an ATTENTION REQ packet is made "255." Therefore, this command is directed to indefinite tape cassettes 1 and hence there may occur an event that the remote memory chip 4 in an adjacent tape cassette 1 in the magazine 52, rather than the remote memory chip 4 in the target tape cassette 1, reacts to the command.

After the ATTENTION REQ packet has been output, at step F103 a corresponding ATTENTION ACK packet is waited for. If an acknowledge as an ATTENTION ACK packet is received successfully, the process goes to step F105. If an acknowledge is not received successfully owing to interference among ATTENTION ACK packets issued from a plurality of remote memory chips 4 or some other reason, step F101 and the following steps are re-executed with a judgment that the position of the hand unit 60 is not appropriate.

If an acknowledge corresponding to the ATTENTION REQ command has been obtained successfully, which means that it has been confirmed that a proper communication state is kept with the target tape cassette 1, step F105 and following steps, that is, steps for requesting reporting of a serial number and other information and authenticating the tape cassette 1 (remote memory chip 4), are executed.

First, at step F105, a REPORT NUM H REQ packet (described above) is output to request the upper 16 bytes of a serial number.

If the upper 16 bytes of the serial number are obtained by a corresponding REPORT NUM H ACK packet, the process goes from step F106 to step F108, where a REPORT NUM L REQ packet is output to request the lower 16 bytes of the serial number.

If the lower 16 bytes of the serial number are obtained by a corresponding REPORT NUM H ACK packet, the process goes from step F109 to step F111, where CRC data are generated based on the received 32-byte serial number.

When CRC data of the serial number have been generated, then at step F112 reporting of CRC data that are recorded in the remote memory chip 4 is requested. That are, a REPORT NUM CRC REQ packet is output. As is understood from FIG. 19, a CRC code, a manufacturer identifier, and a secondary identifier can be captured from the remote memory chip 4 through an acknowledge corresponding to the command.

When an acknowledge (REPORT NUM CRC ACK) is received, the process goes from F113 to F115, where the received CRC code is compared with the CRC code that was generated at step F111. If the two CRC codes coincide with each other, it is judged that a proper communication state is kept with the particular tape cassette 1 and the serial number, the manufacturer identifier, and the secondary identifier that are given to the tape cassette 1 have been captured correctly.

Incidentally, there may occur a case that an acknowledge cannot be received correctly when a command is output at each of steps F105, F108, and F113. For example, this occurs when acknowledges from a plurality of remote memory chips 4 interfere with each other or a command or an acknowledge is not received successfully by the counterpart for a certain reason. In such a case, the authentication is judged unsuccessful and the process returns from step F107, F110, or F114 to step F101 to re-execute the process from the positioning.

Coincidence is found at step F116 in a case where a proper communication with the particular tape cassette 1 has been continued and a serial number etc. have been captured correctly. This means that conditions on which to give a session identifier to the tape cassette 1 (remote memory chip 4) concerned are satisfied (the authentication completed).

In this case, the process goes to step F117 shown in FIG. 33 as indicated by symbol ① and thereafter a substantial session identifier assignment process is executed.

First, at step F117, a call is made of the particular remote memory chip 4 by using the upper 16 bytes of the serial number. Specifically, an ASSERT NUM H REQ command is output. In response, an acknowledge (ASSERT NUM H ACK) is received from the remote memory chip 4 (step F118).

At step F120, a call is made of the particular remote memory chip 4 by using the lower 16 bytes of the serial number. Specifically, an ASSERT NUM L REQ command is output. In response, an acknowledge (ASSERT NUM L ACK) is received from the remote memory chip 4 (step F121).

As a result of the execution of the above steps, it can be confirmed that the remote memory chip 4 having the particular serial number responded to the calls and remote memory chips 4 of the other tape cassettes 1 did not respond. Therefore, at step F123, a session identifier is assigned to the remote memory chip 4 having the particular serial number. Specifically, a certain session identifier N (one of the values 1 to 254) is set corresponding to the code number that is specific to the tape cassette 1 and has been obtained as the serial number, the CRC, the manufacturer identifier, and the secondary identifier (36 bytes in total). The session identifier N thus set is transmitted as an ASSIGN SID REQ packet and stored in the EEPROM 4d of the remote memory chip 4.

When an acknowledge (ASSIGN SID ACK) is received at step F124 in response to the above command, the process is finished with a judgment that the session identifier assignment process has completed properly.

If no proper acknowledge is received in response to the command that is output at step F117 or F120 or to the assignment command that is output at step F123, the process returns to step F101 as indicated by symbol ② to re-execute the process, or a certain operation as an error operation is performed and the process is finished with a judgment that a session identifier cannot be assigned.

As described above in connection with FIGS. 32 and 33, the library controller 80 can assign a session identifier to the remote memory chip 4 of a tape cassette 1 in a magazine 52. Once a session identifier is assigned in the above manner, a desired access operation can be performed on a particular remote memory chip 4 without using a serial number by using a command that includes the session identifier.

As is understood from the above example process, the session identifier assignment process is executed on condition that a proper communication with a particular remote memory chip 4 is kept and a strict authentication to identify the tape cassette 1 has been performed because the steps of checking a serial number and a CRC code are executed. Therefore, there does not occur an event that a certain session identifier is given to an unintended remote memory chip 4 (e.g., the remote memory chip 4 of a tape cassette 1 adjacent to the authenticated tape cassette 1).

8. Data Transfer Process

Next, example access operations using a session identifier will be described with reference to FIGS. 34(A) and 34(B).

Figure 34A:
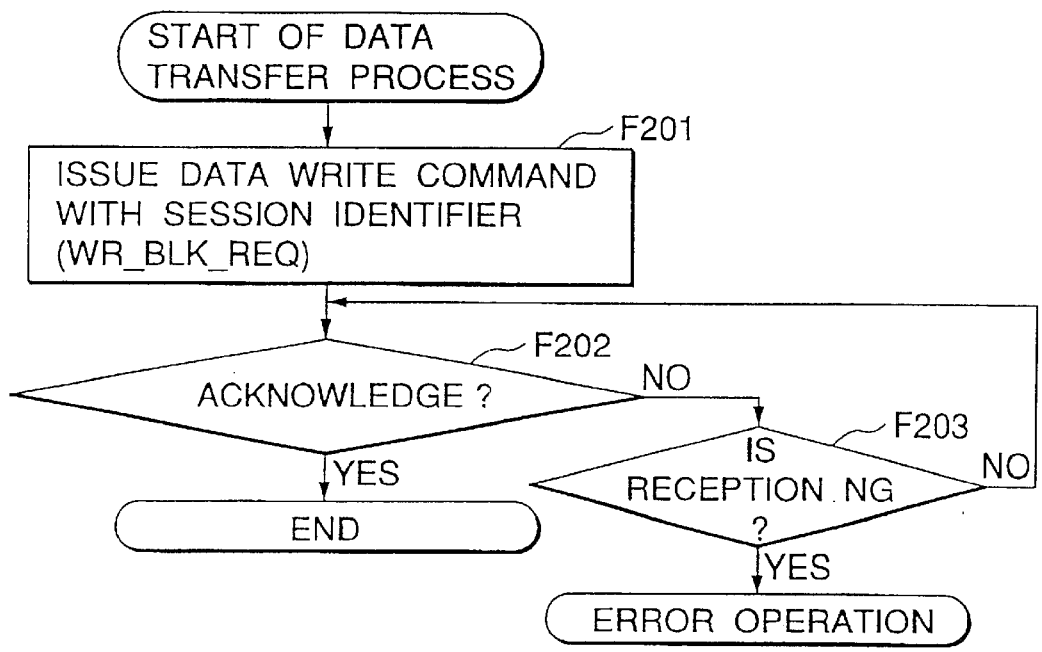
FIGS. 34(A) and 34(B) are flowcharts of data transfer processes of the embodiment.

FIG. 34(A) shows a case of writing data to the EEPROM 4d of a particular remote memory chip 4. It goes without saying that this process is executed after the hand unit 60 has been positioned at the height of a target tape cassette 1 and a state that a communication can be performed with its remote memory chip 4 has been established.

In this case, at step F201, a data write command is output to the remote memory chip 4. Specifically, data are written to the remote memory chip 4 by identifying the remote memory chip 4 by a session identifier and transmitting a write address and write data by using a WR BLK REQ packet.

The remote memory chip 4 returns an acknowledge in response to the write operation. When confirming reception of a proper acknowledge (WR BLK ACK), the library controller 80 finishes the process after executing step F202.

If a proper acknowledge cannot be received, it is judged at step F203 that a write error has occurred. In this case, for example, reception of an acknowledge may be retried after adjusting the position of the hand unit 60.

Figure 34B:
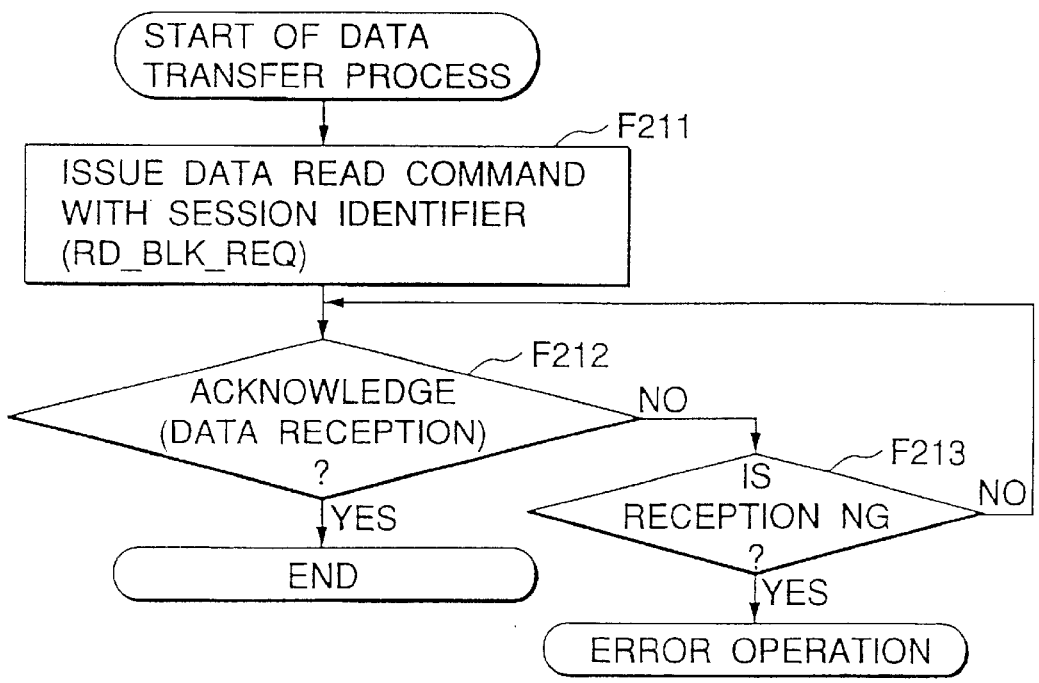

FIG. 34(B) shows a case of requesting data reading from the EEPROM 4d of a particular remote memory chip 4. This process is also executed after the hand unit 60 has been positioned at the height of a target tape cassette 1.

In this case, at step F211, a data read command is output to the remote memory chip 4. Specifically, data are read from the remote memory chip 4 by identifying the remote memory chip 4 by a session identifier and transmitting a read address by using a RD BLK REQ packet.

In response to the read operation, the remote memory chip 4 returns an acknowledge (RD BLK ACK PACKET), by which the library controller 80 can receive read-out data. That is, after recognizing a proper acknowledge and capturing data, the library controller 80 finishes the process after executing step F212.

If a proper acknowledge cannot be received, it is judged at step F213 that a read error has occurred. In this case, for example, reception of an acknowledge may be retried after adjusting the position of the hand unit 60.

The example processes of the write operation and the read operation on a remote memory chip 4 have been described above. As described above in connection with various commands, also in other cases such as a case of requesting a particular remote memory chip 4 to report its status and a case of instructing a particular remote memory chip 4 to make a transition to a reset state, a control on a target remote memory chip 4 can be performed correctly by using a session identifier.

The embodiment of the invention has been described above. However, the invention is not limited to the above-described configurations and operations that are illustrated in the figures, and the formats of data to be stored in a tape cassette, a tape streaming drive, and a remote memory chip, the related operations, etc. can be modified as desired in accordance with actual use conditions and other factors. Naturally, the nonvolatile memory incorporated in the remote memory chip is not limited to an EEPROM.

The above-described embodiment is directed to the system having 8 mm VTR tape cassettes with a nonvolatile memory on and from which a digital signal is recorded and reproduced and the tape streaming drives and the library apparatus corresponding to those tape cassettes. However, the invention is not limited to such a case and can be applied to, for example, a recording/reproduction system capable of recording and reproducing, in the form of a digital signal, information of a video signal or an audio signal.

As described above, in the invention, the recording medium control apparatus such as a library apparatus performs a control using a radio communication command by judging each recording medium based on identification information (e.g., a serial number). At this time, an identifier (session identifier) corresponding to the identification number is set and given to each recording medium and a command that is used in performing a control is caused to include the identifier, whereby only a particular recording medium to be controlled is caused to perform an operation corresponding to the command. As a result, a control can properly be performed on a target recording medium. It becomes possible to correctly write and read data to and from the memory means of a recording medium. Therefore, the invention provides an advantage that a variety of, high-level controls can be performed on a recording medium having a non-contact-type memory means.

Further, by making the identifier short data of about 1 byte, it becomes data that are suitable for inclusion in a packet and a packet communication is made more efficient.

A communication that is performed between the recording medium control apparatus and the recording medium is performed by using a command issued from the recording medium control apparatus and an acknowledge corresponding to the command and issued from the recording medium, and the command and the acknowledge corresponding to the command are formed by different codes. This prevents an event that, for example, an acknowledge issued from a recording medium is recognized as a command for another recording medium, and hence prevents an inappropriate operation from being performed.

The control means of the recording medium control apparatus performs a data transfer as data writing or reading on the memory means of a recording medium with identification of the recording medium by causing the interface means to output a write or read command including the identifier. This enables correct and a variety of write and read controls.

The identifier setting means of the recording medium control apparatus recognizes a recording medium by causing the interface means to output a read instruction command for identification information and receive an acknowledge corresponding to the read instruction command and issued from the recording medium. This enables setting of an identifier after proper identification of a recording medium.

Further, the identifier setting means causes the interface means to output a command including identification information and an identifier that is set corresponding to the identification information, and thereby writing the identifier included in the command to the memory means of a recording medium having the identification information that is included in the command. That is, a control of giving a set identifier to a recording medium is performed by using a command including identification information that is possessed by the recording medium. This prevents an event that an identifier is written to an unintended recording medium that is adjacent to an intended one.

What is claimed is:

1. A recording medium control method that is executed by a recording medium control apparatus having interface means for performing, in non-contact form, data transfer with memory means of a recording medium through a radio communication with communication means of the recording medium, with the recording medium having the memory means that store identification information specific to the recording medium and the communication means for performing data transfer relating to the memory means in non-contact form, said recording medium control method comprising the steps of:

recognizing a recording medium by reading identification information from the memory means of the recording medium via the interface means;

setting an identifier corresponding to the recording medium that has been recognized by the recognizing step and giving the identifier to the memory means of the recording medium via the interface means; and controlling an operation on the memory means of the recording medium with identification of the recording medium by using a command including the identifier.

2. The recording medium control method according to claim 1, wherein in the step of controlling an operation on the memory means is performed as one of data writing and reading on the memory means of the recording medium with identification of the recording medium by using one of a write and read command including the identifier.

3. The recording medium control method according to claim 1, wherein a communication that is performed between the recording medium control apparatus and the recording medium in the recognizing step, the setting step, and the controlling step is performed using a command issued from the recording medium control apparatus and an acknowledge corresponding to the command and issued from the recording medium, and wherein the command and the acknowledge corresponding to the command are formed by different codes.

4. A recording medium control apparatus corresponding to a recording medium having memory means that stores identification information specific to the recording medium and communication means for performing data transfer relating to the memory means in non-contact form, comprising:

interface means for performing data transfer with the memory means of the recording medium in non-contact form by performing a radio communication with the communication means;

identifier setting means for recognizing a recording medium by causing the interface means to read identification information from the memory means of the recording medium, setting an identifier corresponding to the recognized recording medium, and writing the identifier to the memory means of the recording medium via the interface means; and control means for controlling an operation on the memory means of the recording medium with identification of the recording medium by outputting a command including the identifier via the interface means.

5. The recording medium control apparatus according to claim 4, wherein the control means performs data transfer as data writing and reading on the memory means of the recording medium with identification of the recording medium by outputting one of a write and read command including the identifier via the interface means.

6. The recording medium control apparatus according to claim 4, wherein the identifier setting means recognizes the recording medium by outputting a read instruction command for the identification information via the interface means and receiving, via the interface means, an acknowledge corresponding to the read instruction command issued from the recording medium.

7. The recording medium control apparatus according to claim 4, wherein the identifier setting means outputs a command including the identification information and an identifier that is set corresponding to the identification information via the interface means, thereby causing the memory means of the recording medium having the identification information that is included in the command to store the identifier included in the command.

* * * * *